United States Patent
Udagawa et al.

(10) Patent No.: US 12,434,998 B2
(45) Date of Patent: Oct. 7, 2025

(54) RESIN-COATED ULTRA-THIN GLASS

(71) Applicant: TORAY INDUSTRIES, INC., Tokyo (JP)

(72) Inventors: Keizo Udagawa, Otsu (JP); Tatsuya Ohashi, Otsu (JP); Yoshihiko Inoue, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 128 days.

(21) Appl. No.: 18/266,931

(22) PCT Filed: Dec. 16, 2021

(86) PCT No.: PCT/JP2021/046480
§ 371 (c)(1),
(2) Date: Jun. 13, 2023

(87) PCT Pub. No.: WO2022/163191
PCT Pub. Date: Aug. 4, 2022

(65) Prior Publication Data
US 2023/0365458 A1    Nov. 16, 2023

(30) Foreign Application Priority Data

Jan. 29, 2021   (JP) ................. 2021-012743

(51) Int. Cl.
| | | |
|---|---|---|
| C03C 17/30 | (2006.01) | |
| C03C 17/32 | (2006.01) | |
| C03C 17/34 | (2006.01) | |
| C09D 183/04 | (2006.01) | |
| H04M 1/02 | (2006.01) | |

(52) U.S. Cl.
CPC .......... *C03C 17/3405* (2013.01); *C03C 17/30* (2013.01); *C03C 17/32* (2013.01); *C09D 183/04* (2013.01); *H04M 1/0268* (2013.01)

(58) Field of Classification Search
CPC ....... C03C 17/30; C03C 17/32; C03C 17/324; C03C 17/34; C03C 17/3405; C03C 2218/365; B32B 17/10–1099; G06F 1/1333; G06F 1/133302; G06F 1/133305; G06F 1/133311; G06F 1/133331; G06F 1/1652; G09F 9/301; H04M 1/0268; H04M 1/0269; G02F 1/1333; G02F 1/133302; G02F 1/133305; G02F 1/133311; G02F 1/133331
See application file for complete search history.

(56) References Cited

U.S. PATENT DOCUMENTS

| | | | |
|---|---|---|---|
| 2012/0196103 A1* | 8/2012 | Murashige | C03C 17/3405 156/60 |
| 2013/0316133 A1* | 11/2013 | Kim | G06F 1/1656 428/137 |
| 2015/0296646 A1* | 10/2015 | Hasegawa | G02B 5/208 361/679.01 |
| 2017/0174938 A1* | 6/2017 | Shin | C08J 7/043 |
| 2018/0228002 A1* | 8/2018 | Murashige | B32B 17/10 |
| 2020/0011130 A1* | 1/2020 | Blush | C03C 17/3678 |
| 2020/0247092 A1* | 8/2020 | Matsushita | B32B 17/10798 |
| 2021/0080829 A1 | 3/2021 | Fukuzaki et al. | |
| 2021/0107251 A1* | 4/2021 | Chen | H04M 1/0269 |
| 2021/0179487 A1* | 6/2021 | Kim | C09D 5/002 |
| 2021/0380474 A1* | 12/2021 | Brandenburg | C03C 17/32 |
| 2022/0016869 A1* | 1/2022 | Lin | C09K 5/14 |
| 2022/0064059 A1* | 3/2022 | Yun | C03C 17/326 |
| 2022/0236457 A1* | 7/2022 | Hwang | G02B 5/3083 |
| 2022/0298064 A1* | 9/2022 | Xiao | C03C 17/009 |
| 2023/0192974 A1* | 6/2023 | Nishio | G02B 1/14 428/480 |
| 2023/0193093 A1* | 6/2023 | Cao | C09J 7/38 156/329 |
| 2023/0227698 A1* | 7/2023 | Lu | C08G 18/4213 428/343 |
| 2023/0311456 A1* | 10/2023 | Amie | B32B 27/36 |
| 2023/0364888 A1* | 11/2023 | Goyal | B32B 27/08 |
| 2024/0329280 A1* | 10/2024 | Washio | B32B 7/12 |

FOREIGN PATENT DOCUMENTS

| | | |
|---|---|---|
| JP | 2019-214492 A | 12/2019 |
| WO | WO 2018/216570 A1 | 11/2018 |
| WO | WO 2019/066078 A1 | 4/2019 |
| WO | WO-2021108998 A1 * | 6/2021 ............. B32B 17/10 |

OTHER PUBLICATIONS

International Search Report, issued in PCT/JP2021/046480, PCT/ISA/210, dated Feb. 15, 2022.
Written Opinion of the International Searching Authority, issued in PCT/JP2021/046480, PCT/ISA/237, dated Feb. 15, 2022.

\* cited by examiner

*Primary Examiner* — Z. Jim Yang
(74) *Attorney, Agent, or Firm* — Birch, Stewart, Kolasch & Birch, LLP

(57) ABSTRACT

The purpose of the present invention is to provide a resin-coated ultra-thin glass having high impact resistance, satisfactory bending resistance and high transparency. Provided is a resin-coated ultra-thin glass composed of three layers, i.e., an ultra-thin glass (A) having a thickness of 10 to 100 μm inclusive, an organic film (B) formed on one surface of the ultra-thin glass (A), and an organic film (C) formed on the other surface of the ultra-thin glass (A), in which the organic film (B) is formed from a composition containing a thermoplastic resin (D) having a weight-average molecular weight of 1000 to 70000 and the organic film (C) is formed from a composition containing a siloxane resin (E).

9 Claims, No Drawings

RESIN-COATED ULTRA-THIN GLASS

TECHNICAL FIELD

The present invention relates to a resin coated ultra-thin glass sheet.

BACKGROUND ART

In recent years, with the development of novel display panel technologies such as for liquid crystal display devices and organic EL (electroluminescence) display devices, there have been stronger calls for various display terminals such as wearable devices, smartphones, and tablets having characteristic designs with unique display and cover glass shapes.

In particular, active investigations have been made in an attempt to develop flexible, foldable devices that can be folded.

However, to produce foldable devices, it is necessary to use ultra-thin glass sheets with thicknesses of about 0.1 mm or less because they require displays and cases having protective cover glass layers that are thin enough to be curved (hereinafter the term "ultra-thin" will be used occasionally to mean "as thin as 0.1 mm or less"). Since the strength of glass substrates depends largely on their thicknesses, ultra-thin glass substrates having small glass thicknesses generally have the problem of being so small in impact resistance that the glass can be easily broken with a slight impact. On the other hand, if the thickness of an ultra-thin glass substrate is increased with the aim of improving its impact resistance, there will occur the problem of deterioration in the bending resistance, making it difficult to achieve both impact resistance and bending resistance simultaneously.

There is a known glass strength improving technique that provides reinforced glass substrates such as Gorilla Glass (registered trademark) manufactured by Corning Incorporated. This technique is designed to treat a glass substrate with a chemical etc. to form compressive stress layers on both sides of the glass substrate in order to achieve an increased strength as compared with ordinary glass sheets.

There is another glass strength improving technique that is designed to form a film on a glass substrate. Proposals made so far include, for example, a composite material that consists mainly of a glass substrate having microcracks over its surface and a resin layer covering the glass substrate wherein at least part of the microcracks are filled with resin coming from the resin layer (for example, see Patent document 1), a glass protection film prepared from a composition including a polyfunctional epoxy (meth)acrylate compound, a polyfunctional thiol compound, and a radical polymerization initiator (for example, see Patent document 2), a reinforced glass substrate having a cured film containing siloxane resin and silica particles at least on either side of the reinforced glass substrate (for example, see Patent document 3), and a glass-plastic composite film including a glass film with a thickness between 10 μm and 500 μm and a polymer layer with a thickness between 1 μm and 200 μm disposed in direct contact with either side of the glass film (for example, see Patent document 4).

PRIOR ART DOCUMENTS

Patent Documents

Patent document 1: International Publication WO 2015/194324
Patent document 2: Japanese Unexamined Patent Publication (Kokai) No. 2016-3160
Patent document 3: Japanese Unexamined Patent Publication (Kokai) No. 2019-214492
Patent document 4: Published Japanese Translation of PCT International Publication JP 2002-542971

SUMMARY OF INVENTION

Problems to be Solved by the Invention

Thus, improved glass strength can be achieved by using a reinforced glass substrate or techniques as proposed in Patent documents 1 to 4. However, due to, for example, increasing numbers of devices having built-in touch panels, there are increasing demands for foldable devices having both high impact resistance and high bending resistance, posing a problem to solve.

In view of this problem with the conventional technologies, the main object of the present invention is to provide a resin coated ultra-thin glass sheet having high impact resistance, high bending resistance, and high transparency.

Means of Solving the Problems

As a result of intensive studies aiming to solve the problems with the conventional technologies, the present inventors found that the following constitution is highly effective and arrived at the present invention.

Specifically, the present invention relates to a resin coated ultra-thin glass sheet of a three layer structure including an ultra-thin glass sheet (A) with a thickness of 10 μm or more and 100 μm or less, an organic film (B) disposed on either side thereof, and an organic film (C) disposed on the other side thereof wherein the organic film (B) is formed from a composition containing a thermoplastic resin (D) with a weight-average molecular weight of 1,000 to 70,000 and wherein the organic film (C) is formed from a composition containing a siloxane resin (E).

Advantageous Effects of the Invention

The present invention can provide a resin coated ultra-thin glass sheet having high impact resistance, high bending resistance, and high transparency.

DESCRIPTION OF PREFERRED EMBODIMENTS

The invention will be described in more detail below.
Ultra-Thin Glass Sheet (A)

It is essential for the ultra-thin glass sheet (A) used for the present invention to have a thickness of 10 μm or more and 100 μm or less. In order to provide a resin coated ultra-thin glass sheet having high impact resistance, it should be 10 μm or more, preferably 20 μm or more, and more preferably 30 μm or more. In order to provide a resin coated ultra-thin glass sheet having high bending resistance, it should be 100 μm or less, preferably 80 μm or less.

There are no specific limitations on the ultra-thin glass sheet (A) used for the present invention, and it may be of, for example, aluminosilicate glass, soda-lime glass, non-alkali glass, etc., but it is preferably of reinforced glass from the viewpoint of producing a resin coated ultra-thin glass sheet with high bending resistance.

Reinforced glass as referred to herein means a glass substrate that has undergone reinforcing treatment and it is preferable that either surface of the glass substrate is covered by a compressive stress layer.

Known methods for forming a compressive stress layer include, for example, a physical reinforcing process that makes use of expansion and shrinkage of glass caused by heating and cooling and a chemical reinforcing process designed to replace the alkali ion in glass with another alkali ion having a larger ionic radius. These methods are generally known and a good method may be selected appropriately. For use as a thin reinforced glass substrate to serve as cover glass such as for touch panels, it is preferable to use glass that is reinforced by the chemical reinforcing process, namely, so-called chemically reinforced glass.

Of the various types of chemically reinforced glass, in particular, chemically reinforced aluminosilicate glass and chemically reinforced soda-lime glass are more preferable.

Examples of a non-reinforced ultra-thin glass sheet (A) include AF32 (registered trademark) eco series (manufactured by Schott), Corning (registered trademark) and Willow (registered trademark) Glass series (manufactured by CORNING), G-Leaf (registered trademark) series (manufactured by Nippon Electric Glass Co., Ltd.), and SPOOL (registered trademark) series (manufactured by AGC Inc.).

Examples of a chemically reinforced ultra-thin glass sheet (A) include Xensation (registered trademark) series (manufactured by Schott), Corning (registered trademark) and Gorilla (registered trademark) Glass series (manufactured by CORNING), Dinorex (registered trademark) series (manufactured by Nippon Electric Glass Co., Ltd.), and Dragontrail (registered trademark) series (manufactured by AGC Inc.).

Organic Film (B)

The ultra-thin glass sheet (A) used for the present invention has, on either side thereof, an organic film (B) that contains a composition including a thermoplastic resin (D) with a weight-average molecular weight of 1,000 to 70,000.

Useful resin compositions to form the organic film (B) are described below. The organic film (B) is preferably a buffer film (b). The buffer film (b) is an organic film that serves to improve the impact resistance by reducing the effect of external impact applied to the resin coated ultra-thin glass sheet.

The organic film (B) preferably has a thickness of 10 µm or more and 100 µm or less. In order to allow the resin coated ultra-thin glass sheet according to the present invention to have a further improved impact resistance, it is preferably 10 µm or more, more preferably 15 µm or more, and still preferably 30 µm or more. In order to allow the resin coated ultra-thin glass sheet according to the present invention to have a further improved bending resistance, it is preferably 100 µm or less, more preferably 70 µm or less, and still more preferably 50 µm or less.

From the viewpoint of color reproducibility and transparency of a display to be produced, it is preferable that, when light coming from a CIE standard D65 light source is applied to the organic film (B) used for the present invention, the transmitted light show a yellow index (YI) that meets the relation |YI|<20, more preferably |YI|<5, and still more preferably |YI|<2, wherein the yellow index is as specified in JIS K 7373:2006.

The other surface of the organic film (B), that is, the surface not covered by the ultra-thin glass sheet (A), is preferably covered by a hard coat layer. The hard coat layer preferably has a thickness of 1 µm or more and 20 µm or less. In order to allow the resin coated ultra-thin glass sheet according to the present invention to have a further improved surface hardness and impact resistance, it is preferably 1 µm or more, and more preferably 5 µm or more. The surface hardness referred to herein means the hardness value that is measured according to the pencil hardness test (under a load of 750 g) specified in JIS K 5600-5-4 (1999). In order to allow the resin coated ultra-thin glass sheet to have a further improved bending resistance, it is preferably 20 µm or less, and more preferably 15 µm or less.

Such a hard coat layer can be formed from a thermosetting resin, a resin having a radical polymerizable group, etc., of which a resin having a radical polymerizable group is preferably contained because it can be cured by ultraviolet ray and ensure high productivity. Preferable radical polymerizable groups include vinyl group, allyl group, acrylic group, and methacrylic group. Examples of the resin having a radical polymerizable group include monomers having radical polymerizable groups, polymers having radical polymerizable groups, etc. To produce a hard coat layer, it may be good to use a single resin having a radical polymerizable group or simultaneously use two or more resins as a mixture. In addition, these resins having radical polymerizable groups may contain a third component such as photo-radical initiator, photosensitizer, surfactant, thermosetting resin, metal oxide, solvent, fine particle and ultrafine particle of acrylic material etc., which may be used singly or as a combination of two or more thereof.

A preferable resin composition to be used as the organic film (B) for the present invention contains a thermoplastic resin (D) as an essential component and preferably contains a solvent to ensure coatability.

Thermoplastic Resin (D)

It is necessary for the thermoplastic resin (D) used for the present invention to have a weight-average molecular weight of 1,000 to 70,000. In order to allow the resin coated ultra-thin glass sheet according to the present invention to have high impact resistance, the weight-average molecular weight should be 1,000 or more, preferably 5,000 or more, and still more preferably 10,000 or more. On the other hand, from the viewpoint of the bending resistance of the organic film (B) used for the present invention, the weight-average molecular weight should be 70,000 or less, preferably 35,000 or less, and still more preferably 25,000 or less. Here, the weight-average molecular weight referred to above means the standard polystyrene-based value measured by gel permeation chromatography.

It is preferable for the thermoplastic resin (D) used for the present invention to have a glass transition temperature (Tg) of 40° C. to 110° C. In order to allow the resin coated ultra-thin glass sheet to have a further improved impact resistance, it is preferably 40° C. or more, more preferably 50° C. or more, and still more preferably 60° C. or more. In order to allow the resin coated ultra-thin glass sheet to have a further improved impact resistance, it is preferably 110° C. or less, more preferably 100° C. or less, and still more preferably 75° C. or less. Here, the glass transition temperature (Tg) referred to above means a glass transition temperature value determined by differential scanning calorimetry (DSC).

Preferable resins for use as the thermoplastic resin (D) for the present invention include polyester resin, (meth)acrylate resin, polyester polyurethane resin, polyurethane resin, silicone resin, cellulose resin, polyolefin resin, epoxy resin, and vinyl chloride-vinyl acetate copolymer resin. Of these, the use of a polyester resin or a (meth)acrylate resin is preferable in order to allow the resin coated ultra-thin glass sheet according to the present invention to have high impact resistance and transparency. They may be used singly or as a mixture of two or more thereof.

Examples of the polyester resin include VYLON (registered trademark) 200 (weight-average molecular weight: 17,000, Tg: 67° C.), VYLON 220 (weight-average molecular weight: 3,000, Tg: 53° C.), VYLON 226 (weight-average molecular weight: 8,000, Tg: 65° C.), VYLON 240 (weight-average molecular weight: 15,000, Tg: 60° C.), VYLON 270 (weight-average molecular weight: 23,000, Tg: 67° C.), VYLON 290 (weight-average molecular weight 22,000, Tg: 72° C.), VYLON 660 (weight-average molecular weight: 8,000, Tg: 55° C.), VYLON 802 (weight-average molecular weight: 3,000, Tg: 60° C.), VYLON 882 (weight-average molecular weight: 15,000, Tg: 68° C.), VYLON 885 (weight-average molecular weight: 8,000, Tg: 79° C.), VYLON GK-250 (weight-average molecular weight: 10,000, Tg: 60° C.), VYLON GK-360 (weight-average molecular weight: 16,000, Tg: 56° C.), VYLON GK-880 (weight-average molecular weight: 18,000, Tg: 84° C.), VYLON 103 (weight-average molecular weight 23,000, Tg: 47° C.), VYLON 600 (weight-average molecular weight: 16,000, Tg: 47° C.), VYLON GK-800 (weight-average molecular weight: 27,000, Tg: 50° C.), and VYLON GK-810 (weight-average molecular weight: 6,000, Tg: 46° C.) (all trade names, manufactured by Toyobo Co., Ltd.). Examples of the (meth)acrylate resin include Hi-pearl (registered trademark) M-4006 (weight-average molecular weight: 35,000, Tg: 105° C.). Two or more of these may be contained together.

For the present invention, it is preferable for the organic film (B) to contain a thermosetting resin.

For the present invention, the organic film (B) is formed from a composition containing a thermoplastic resin (D) with a weight-average molecular weight of 1,000 to 70,000 and the composition containing a thermoplastic resin (D) preferably contains a thermosetting resin in order to ensure a further improved surface hardness.

Examples of such a thermosetting resin include (meth) acrylate based compounds, epoxy based compounds, and melamine based compounds, and in particular, the use of a (meth)acrylate based compound is preferable from the viewpoint of long-term stability. As such a (meth)acrylate based compound, the use of a urethane (meth)acrylate compound is preferable in order to allow the organic film (B) to have both high bending resistance and high surface hardness.

The urethane (meth)acrylate compound to use preferably accounts for 5 to 35 wt % relative to the total solid content in the organic film (B). It preferably accounts for 5 wt % or more in order to allow the organic film (B) to have a further improved surface hardness and impact resistance. In order to allow the organic film (B) to show a further improved bending resistance and yellow index, it preferably accounts for 35 wt % or less, more preferably 25 wt % or less, and still more preferably 15 wt % or less. Here, the total solid content referred to above means the total content of the other components than the solvent in the organic film (B). The urethane (meth)acrylate used for the present invention preferably has a double bond equivalent weight of 100 to 600 g/mol. It preferably accounts for 100 g/mol or more in order to allow the organic film (B) to have a further improved bending resistance. In order to produce a resin coated ultra-thin glass sheet having a further improved surface hardness, it is preferably accounts for 600 g/mol or less, more preferably 250 g/mol or less, and still more preferably 150 g/mol or less.

The composition that contains a thermoplastic resin (D) preferably includes a solvent from the viewpoint of coatability. Examples of such a solvent include ester based solvents, ether based solvents, acetate based solvents, alcohol based solvents, ketone based solvents, and lactone based solvents. Two or more of these may be contained together. Another solvent such as xylene, ethyl benzene, and solvent naphtha may be used in combination.

Examples of the ester based solvents include benzyl acetate, ethyl benzoate, γ-butyrolactone, methyl benzoate, diethyl malonate, 2-ethylhexyl acetate, 2-butoxyethyl acetate, 3-methoxy-3-methyl-butyl acetate, diethyl oxalate, ethyl acetoacetate, 3-methoxy-butyl acetate, methyl acetoacetate, ethyl-3-ethoxy propionate, 2-ethylbutyl acetate, isopentyl propionate, propylene glycol monomethyl ether propionate, propylene glycol monoethyl ether acetate, pentyl acetate, propylene glycol monomethyl ether acetate, dipropylene glycol monomethyl ether acetate, ethyl acetate, butyl acetate, and isopentyl acetate. Of these, acetate based solvents such as 3-methoxy-3-methyl-butyl acetate and propylene glycol monoethyl ether acetate, and propionate based solvents such as propylene glycol monomethyl ether propionate are preferable, of which 3-methoxy-butyl acetate and propylene glycol monomethyl ether acetate are more preferable.

Examples of the ether based solvents include propylene glycol monomethyl ether, propylene glycol monoethyl ether, propylene glycol tertiary butyl ether, diethylene glycol methylethyl ether, and dipropylene glycol monomethyl ether.

Examples of the alcohol based solvents include butanol, 3-methyl-2-butanol, and 3-methyl-3-methoxy butanol.

Examples of the ketone based solvents include cyclopentanone and cyclohexanone.

Examples of the lactone based solvents include γ-butyrolactone, γ-valerolactone, and δ-valerolactone.

The composition that includes a thermoplastic resin (D) may also include other additives. Examples of such other additives include adhesion promoter, surfactant, polymerization terminator, and antioxidant.

Examples of the adhesion promoter include silane coupling agents such as vinyl trimethoxysilane, vinyl triethoxysilane, vinyl tris(2-methoxyethoxy) silane, N-(2-aminoethyl)-3-aminopropylmethyl dimethoxy silane, N-(2-aminoethyl)-3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-chloropropylmethyl dimethoxysilane, 3-chloropropyl trimethoxysilane, 3-methacryloxypropyl trimethoxysilane, 3-methacryloxypropyl triethoxysilane, 3-acryloxypropyl trimethoxysilane, and 3-mercaptopropyl trimethoxysilane.

Examples of the surfactants include fluorine based surfactants; silicone based surfactants; fluorine-containing heat-decomposable surfactants; polyether modified siloxane based surfactants; polyalkylene oxide based surfactants; poly(meth)acrylate based surfactants; anionic surfactants such as ammonium lauryl sulfate and triethanolamine polyoxyethylene alkyl ether sulfate; cationic surfactants such as stearylamine acetate and lauryl trimethylammonium chloride; amphoteric surfactants such as lauryl dimethylamine oxide and lauryl carboxymethyl hydroxyethyl imidazolium betaine; nonionic surfactants such as polyoxyethylene lauryl ether, polyoxyethylene stearyl ether, and sorbitan monostearate. Two or more of these may be contained together.

Of these, fluorine based surfactants, silicone based surfactants, fluorine-containing heat-decomposable surfactants, and polyether modified siloxane based surfactants are preferable from the viewpoint of suppressing coating defects such as cissing, reducing the surface tension, and preventing uneven drying of coating films, and fluorine-containing heat-decomposable surfactants are more preferable.

Commercial products of fluorine based surfactants include, for example, Megafac (registered trademark) F142D, F172, F173, F183, F445, F470, F475, and F477 (all manufactured by DIC Corporation), and NBX-15 and FTX-218 (manufactured by Neos Co., Ltd.). Commercial products of silicone based surfactants include, for example, BYK (registered trademark)-333, BYK-301, BYK-331, BYK-345, and BYK-307 (manufactured by BYK Japan KK). Commercial products of fluorine-containing heat-decomposable surfactants include, for example, Megafac (registered trademark) DS-21 (manufactured by DIC Corporation). Commercial products of polyether modified siloxane based surfactants include, for example, BYK (registered trademark)-345, BYK-346, BYK-347, BYK-348, and BYK-349 (all manufactured by all BYK Japan KK), and Silface (registered trademark) SAG002, SAG005, SAG0503A, and SAG008 (all manufactured by Nissin Chemical Industry Co., Ltd.).

Examples of the polymerization terminator include hydroquinone based or catechol based polymerization terminators. Examples of the hydroquinone based polymerization terminators include hydroquinone, tert-butylhydroquinone, 2,5-bis(1,1,3,3-tetramethylbutyl)hydroquinone, and 2,5-bis(1,1-dimethylbutyl)hydroquinone. Examples of the catechol based polymerization terminators include catechol and tert-butylcatechol.

Examples of the antioxidants include phenolic antioxidants, phosphorus based antioxidants, and sulfur based antioxidants. Two or more of these may be contained together.

Next, production methods for a resin composition containing a thermoplastic resin (D) are described below.

In a typical production methods for a resin composition containing a thermoplastic resin (D), a thermoplastic resin (D) is put in a solvent and heated while stirring to prepare a solution of the thermoplastic resin (D). In general, appropriate quantities of other materials such as solvent, thermosetting resin, adhesion promoter, surfactant, polymerization terminator, and antioxidant are mixed in the solution of the thermoplastic resin (D) as required, followed by stirring.

Organic Film (C)

An organic film (C) formed from a composition containing a siloxane resin (E) is disposed on that side of the ultra-thin glass sheet (A) used for the present invention which is not covered by the organic film (B).

For the present invention, useful resin compositions that serve to form such an organic film (C) are described below. The organic film (C) is preferably a reinforcing film (c). A reinforcing film (c) is an organic film that works to prevent cracks from being caused in the folded parts of the resin coated ultra-thin glass sheet to allow the resin coated ultra-thin glass sheet to have an increased bending resistance.

The organic film (C) used for the present invention is preferably a cured film formed by curing a composition containing a siloxane resin (E). The cured film that works as the organic film (C) for the present invention is formed as a result of crosslinking of the siloxane resin in the composition through a condensation reaction of the silanol group (thermal crosslinking) or a radical addition reaction of the radical polymerizable group (photocrosslinking). Here, whether or not such crosslinks are present can be judged by performing IR analysis of the cured film to determine the existence/absence and the sizes of the peaks attributable to the silanol group or double bonds.

It is preferable for the organic film (C) to have a thickness of 1 µm or more and 20 µm or less. In order to allow the resin coated ultra-thin glass sheet to have a further improved glass strength, it is preferably 1 µm or more, more preferably 2 µm or more, and still preferably 3 µm or more. In order to allow the resin coated ultra-thin glass sheet to have a further improved bending resistance, it is preferably 20 µm or less, more preferably 15 µm or less, and still more preferably 10 µm or less.

The other surface of the organic film (C), that is, the surface not covered by the ultra-thin glass sheet (A), is preferably covered by a transparent adhesive layer. Examples of materials for such a transparent adhesive layer include OCR (optically clear resin), OCA (optical clear adhesive), and LOCA (liquid optically clear adhesive). It is preferable for the transparent adhesive layer to have a thickness of 10 µm or more and 200 µm or less. In order to ensure an increased adhesive strength, it is preferably 10 µm or more, more preferably 15 µm or more, and still preferably 20 µm or more. In order to allow the resin coated ultra-thin glass sheet to have a further improved bending resistance, it is preferably 200 µm or less, more preferably 100 µm or less, and still more preferably 30 µm or less.

The total light transmittance of the transparent adhesive layer is preferably 90% or more. In order to ensure the production of a display with a further increased brightness, it is preferably 90% or more, more preferably 95% or more, and still preferably 98% or more. The total light transmittance referred to herein means a value determined according to JIS K 7361-1.

It is preferable for the transparent adhesive layer to have a haze value of 10% or less. In order to produce a display with an increased transparency, it is preferably 10% or less, more preferably 5% or less, and still more preferably 3% or less. The haze value referred to herein means a value determined according to JIS K 7136.

It is preferable for the transparent adhesive layer to have a storage elastic modulus at 25° C. of 0.05 MPa or more and 1.5 Mpa or less. In order to allow the resin coated ultra-thin glass sheet to have a further improved impact resistance, it is preferably 0.05 Mpa or more, more preferably 0.10 Mpa or more, and still preferably 0.15 Mpa or more. In order to ensure an increased adhesive strength, it is preferably 1.5 Mpa or less, more preferably 1.0 Mpa or less, and still preferably 0.5 Mpa or less.

Examples of useful resins to form a transparent adhesive layer include (meth)acrylic resins, silicone resins, and polyurethane resins, of which (meth)acrylic resins are preferable from the viewpoint of transparency in the visible light range and stability. The transparent adhesive layer may contain only one resin or a mixture of two or more resins. In addition, these resins may contain, as a third component, one or a plurality of other substances including monomers, crosslinking agents, solvents, silane coupling agents, antistatic agents, tackifiers, antioxidants, ultraviolet absorbers, and leveling agents.

Siloxane Resin (E)

The resin composition to be used as the organic film (C) for the present invention includes a siloxane resin (E) as an essential component and preferably contains a solvent to ensure coatability.

The siloxane resin (E) used for the present invention is a polymer that contains a repeating unit having a siloxane backbone and it is preferably a hydrolysis-condensation product of an organosilane compound. However, in the case where the siloxane resin (E) has an oxetanyl group, it is categorized as a "siloxane compound having an oxetanyl group" described later.

The siloxane resin (E) used for the present invention preferably has a weight-average molecular weight of 2,000 to 7,000 in order to ensure an increased coatability.

In the siloxane resin (E) used for the present invention, the phenyl group preferably accounts for 5 to 60 mol % relative to the Si atom. In order to relax the stress in the film and allow the resin coated ultra-thin glass sheet to have a further improved bending resistance, it is preferable for the phenyl group in the siloxane resin (E) to account for 5 mol % or more relative to the Si atom. It preferably accounts for 60 mol % or less because it serves to increase the degree of crosslinking in the organic film (C) and allow the resin coated ultra-thin glass sheet to have a further improved bending resistance.

The siloxane resin (E) used for the present invention preferably has a radical polymerizable group. Because of the inclusion of a radical polymerizable group along with the photo-radical polymerization initiator described later, a radical polymerization reaction can be caused by radicals generated by light irradiation, which acts to increase the degree of crosslinking in the organic film (C) used for the present invention and allow the resin coated ultra-thin glass sheet to have a further improved bending resistance.

Examples of the radical polymerizable group include vinyl group, α-methylvinyl group, allyl group, styryl group, and (meth)acryloyl group. The use of a (meth)acryloyl group is preferable in order to allow the organic film (C) used for the present invention to have a further increased degree of crosslinking. The siloxane resin having a radical polymerizable group is preferably a hydrolysis-condensation product of an organosilane compound having a radical polymerizable group. It may also be a hydrolysis-condensation product of an organosilane compound having a radical polymerizable group and an organosilane compound of other type. Examples of such an organosilane compound having a radical polymerizable group include vinyl trimethoxysilane, vinyl triethoxysilane, vinyl triisopropoxysilane, vinyl tri(2-methoxyethoxy)silane, vinyl triacetoxysilane, vinylmethyl dimethoxysilane, vinylmethyl diethoxysilane, allyl trimethoxysilane, allyl triethoxysilane, allylmethyl dimethoxysilane, allylmethyl diethoxysilane, p-styryl trimethoxysilane, p-styryl triethoxysilane, p-styrylmethyl dimethoxy silane, p-styrylmethyl diethoxysilane, 3-acryloxypropyl trimethoxysilane, 3-acryloxypropyl triethoxysilane, 3-acryloxypropylmethyl dimethoxysilane, 3-acryloxypropylmethyl diethoxysilane, 3-methacryloxypropyl trimethoxysilane, 3-methacryloxypropyl triethoxysilane, 3-methacryloxypropylmethyl dimethoxysilane, and 3-methacryloxypropylmethyl diethoxysilane. Two or more of these may be used in combination. Of these, 3-acryloxypropyl trimethoxysilane, 3-acryloxypropyl triethoxysilane, 3-methacryloxypropyl trimethoxysilane, and 3-methacryloxypropyl triethoxysilane are preferable in order to further increase the degree of crosslinking in the organic film (C) to allow the resin coated ultra-thin glass sheet to have a further improved bending resistance.

Examples of such an organosilane compound of other type include methyl trimethoxysilane, methyl triethoxysilane, methyl tripropoxysilane, methyl triisopropoxysilane, methyl tributoxysilane, methyl triphenoxysilane, dimethyl dimethoxysilane, dimethyl diethoxysilane, ethyl trimethoxysilane, ethyl triethoxysilane, diethyl dimethoxysilane, n-propyl trimethoxysilane, isopropyl trimethoxysilane, diisopropyl dimethoxysilane, n-butyl trimethoxysilane, isobutyl trimethoxysilane, isobutyl triethoxysilane, diisobutyl dimethoxysilane, n-hexyl trimethoxysilane, n-hexyl triethoxysilane, cyclohexyl trimethoxysilane, cyclohexyl triethoxysilane, n-octyl trimethoxysilane, n-octyl triethoxysilane, n-decyl trimethoxysilane, n-decyl triethoxysilane, trifluoromethyl trimethoxysilane, trifluoromethyl triethoxysilane, trifluoropropyl trimethoxysilane, trifluoropropyl triethoxysilane, phenyl trimethoxysilane, phenyl triethoxysilane, diphenyl dimethoxysilane, diphenyl diethoxysilane, 3-aminopropyl trimethoxysilane, 3-aminopropyl triethoxysilane, N-(2-aminoethyl)-3-aminopropyl trimethoxysilane, N-(2-aminoethyl)-3-aminopropyl triethoxysilane, N-(2-aminoethyl)-3-aminopropylmethyl dimethoxysilane, N-phenyl-3-aminopropyl trimethoxysilane, 3-triethoxysilyl-N-(1,3-dimethyl-butylidene)propyl amine, N-(1,3-dimethylbutylidene)-3-aminopropyl triethoxysilane, 3-glycidoxypropyl trimethoxysilane, 3-glycidoxypropyl triethoxysilane, 3-glycidoxypropylmethyl dimethoxysilane, 3-glycidoxypropylmethyl diethoxysilane, 2-(3,4-epoxycyclohexyl)ethyl trimethoxysilane, 2-(3,4-epoxycyclohexyl)ethyl triethoxysilane, 3-mercaptopropyl trimethoxysilane, 3-mercaptopropyl triethoxysilane, 3-mercaptopropylmethyl dimethoxysilane, 3-ureidopropyl trimethoxysilane, 3-ureidopropyl triethoxysilane, 3-isocyanatepropyl trimethoxysilane, 3-isocyanatepropyl triethoxysilane, tris(trimethoxysilylpropyl) isocyanurate, bis(3-(triethoxysilyl)propyl) disulfide, bis(3-(triethoxysilyl)propyl) tetrasulfide, 3-trimethoxysilylpropyl succinic anhydride, and 3-triethoxysilylpropyl succinic anhydride. Two or more of these may be used in combination.

For the present invention, the siloxane resin (E) can be produced by hydrolysis-condensation of an organosilane compound. For example, it can be produced by hydrolyzing an organosilane compound and subjecting the resulting silanol compound to a condensation reaction in the presence of a solvent or under solvent-free conditions.

The conditions for the hydrolysis reaction may be set up appropriately taking into consideration the reaction scale, the size and shape of the reaction container, etc. For example, a preferable procedure is adding an acid catalyst and water to an organosilane compound in a solvent over 1 to 180 minutes and then allowing them to react for 1 to 180 minutes in the temperature range from room temperature to 110° C. The implementation of such a hydrolysis reaction under these conditions serves to prevent the reaction from proceeding too rapidly. The reaction temperature is more preferably 30° C. to 105° C.

It is preferable that the hydrolysis reaction is conducted in the presence of an acid catalyst. As acid catalyst, it is preferable to use an acidic aqueous solution containing formic acid, acetic, or phosphoric acid. The content of the acid catalyst is preferably 0.1 to 5 parts by weight relative to the total amount, which represents 100 parts by weight, of the organosilane compound used for the hydrolysis reaction. Adjusting the content of the acid catalyst in the above range allows the hydrolysis reaction to proceed more efficiently.

It is preferable that the production of a silanol compound through a hydrolysis reaction of an organosilane compound be followed by subjecting the resulting reaction liquid directly to a condensation reaction by heating at a temperature of not lower than 50° C. and not higher than the boiling point of the solvent for 1 to 100 hours. In addition, the liquid may be heated again or a basic catalyst may be added with the aim of increasing the polymerization degree of the polysiloxane. Useful solvents to apply to the hydrolysis reaction of an organosilane compound and the condensation reaction of a silanol compound include, for example, alcohols such as methanol, ethanol, propanol, isopropanol, butanol, isobutanol, t-butanol, pentanol, 4-methyl-2-pentanol, 3-methyl-2-butanol, 3-methoxy-1-butanol, 3-methyl-3-methoxy-1-butanol, 1-t-butoxy-2-propanol, and diacetone alcohol; glycols such as ethylene glycol and propylene glycol; ethers such as ethylene glycol monomethyl ether, ethylene glycol monoethyl ether, propylene glycol monomethyl ether, propylene glycol monoethyl ether, propylene glycol monopropyl ether, propylene glycol monobutyl ether, ethylene glycol dimethyl ether, ethylene glycol diethyl ether, ethylene glycol dibutyl ether, and diethyl ether; ketones such as methyl ethyl ketone, acetylacetone, methylpropyl ketone, methylbutyl ketone, methylisobutyl ketone, diisobutyl ketone, cyclopentanone, and 2-heptanone; amides such as dimethyl formamide and dimethyl acetamide; acetates such as ethyl acetate, propyl acetate, butyl acetate, isobutyl acetate, ethylene glycol monoethyl ether acetate, propylene glycol monomethyl ether acetate, 3-methoxybutyl acetate, 3-methyl-3-methoxybutyl acetate, methyl lactate, ethyl lactate, and butyl lactate; aromatic or aliphatic hydrocarbons such as toluene, xylene, hexane, and cyclohexane; and others such as γ-butyrolactone, N-methyl-2-pyrrolidone, and dimethyl sulfoxide. In order to increase the transmittance and crack resistance of the organic film (C), preferable ones include diacetone alcohol, propylene glycol monomethyl ether, propylene glycol monomethyl ether acetate, propylene glycol monoethyl ether, propylene glycol mono-t-butyl ether, propylene glycol monopropyl ether, propylene glycol monobutyl ether, and γ-butyrolactone.

Solvent free hydrolysis may be performed in the case where a solvent is generated from the hydrolysis reaction. It is also preferable that an additional solvent be added after the end of the reaction to adjust the resulting composition to an appropriate concentration. To suit particular purposes, furthermore, an appropriate amount of the resulting alcohol etc. may be distilled out and removed by heating and/or reducing the pressure after the hydrolysis reaction, followed by adding an appropriate solvent.

The solvent used for the hydrolysis reaction preferably accounts for 80 to 500 parts by weight relative to the total amount, which represents 100 parts by weight, of the organosilane compound. Adjusting the amount of the solvent in the above range allows the hydrolysis reaction to proceed more efficiently.

The water used for the hydrolysis reaction is preferably ion-exchanged water. The water preferably accounts for 1.0 to 4.0 moles relative to 1 mole of the silane atom.

In order to allow the resin coated ultra-thin glass sheet to have a further improved bending resistance and transparency, it is preferable that the siloxane resin (E) in the composition that contains the siloxane resin (E) account for 15 wt % or more, more preferably 25 wt % or more, relative to the total solid content. On the other hand, in order to increase the bendability of the organic film (C), it is preferable for the siloxane resin to account for 90 wt % or less, more preferably 80 wt % or less, relative to the total solid content.

The composition that contains the siloxane resin (E) preferably contains a solvent from the viewpoint of coatability. If a solvent is contained, it will serve to dissolve each component uniformly. Examples of such a solvent include aliphatic hydrocarbons, carboxylates, ketones, ethers, and alcohols. Two or more of these may be contained together.

In order to achieve uniform dissolution of each component to permit the formation of a coating film with improved transparency, it is preferable to use a compound having an alcoholic hydroxyl group or a cyclic compound having a carbonyl group.

Examples of such a compound having an alcoholic hydroxyl group include acetol, 3-hydroxy-3-methyl-2-butanone, 4-hydroxy-3-methyl-2-butanone, 5-hydroxy-2-pentanone, 4-hydroxy-4-methyl-2-pentanone (diacetone alcohol), ethyl lactate, butyl lactate, propylene glycol monomethyl ether, propylene glycol monoethyl ether, propylene glycol mono-n-propyl ether, propylene glycol mono-n-butyl ether, propylene glycol mono-t-butyl ether, 3-methoxy-1-butanol, and 3-methyl-3-methoxy-1-butanol. Of these, diacetone alcohol and 3-methyl-3-methoxy-1-butanol are preferable from the viewpoint of storage stability.

Specific examples of such a cyclic compound having a carbonyl group include γ-butyrolactone, γ-valerolactone, δ-valerolactone, propylene carbonate, N-methyl pyrrolidone, cyclohexanone, and cycloheptanone. Of these, γ-butyrolactone can be used particularly suitably.

Examples of the aliphatic hydrocarbons include xylene, ethyl benzene, and solvent naphtha.

Examples of the carboxylates include benzyl acetate, ethyl benzoate, γ-butyrolactone, methyl benzoate, diethyl malonate, 2-ethylhexyl acetate, 2-butoxyethyl acetate, 3-methoxy-3-methyl-butyl acetate, diethyl oxalate, ethyl acetoacetate, cyclohexyl acetate, 3-methoxy-butyl acetate, methyl acetoacetate, ethyl-3-ethoxy propionate, 2-ethylbutyl acetate, isopentyl propionate, propylene glycol monomethyl ether propionate, propylene glycol monoethyl ether acetate, ethyl acetate, butyl acetate, isopentyl acetate, pentyl acetate, and propylene glycol monomethyl ether acetate.

Examples of the ketones include cyclopentanone and cyclohexanone.

Examples of the ethers include aliphatic ethers such as propylene glycol derivatives including propylene glycol monomethyl ether, propylene glycol monoethyl ether, propylene glycol tertiary butyl ether, and dipropylene glycol monomethyl ether.

From the viewpoint of ensuring improved coatability by appropriately controlling the volatility and drying characteristics during the coating of an ultra-thin glass sheet (A) with a composition containing the siloxane resin (E), it is preferable to include a solvent having a boiling point of 150° C. or more and 250° C. or less under atmospheric pressure and a solvent having a boiling point of less than 150° C. under atmospheric pressure. It is more preferable for the solvent having a boiling point of 150° C. or more and 250° C. or less under atmospheric pressure to have a boiling point of 150° C. or more and 200° C. or less.

Examples of the solvent having a boiling point of 150° C. or more and 250° C. or less under atmospheric pressure include 4-hydroxy-4-methyl-2-pentanone (diacetone alcohol), ethyl lactate, butyl lactate, propylene glycol mono-t-butyl ether, 3-methoxy-1-butanol, 3-methyl-3-methoxy-1-butanol, benzyl acetate, ethyl benzoate, methyl benzoate, diethyl malonate, 2-ethylhexyl acetate, 2-butoxyethyl acetate, 3-methoxy-3-methyl-butyl acetate, diethyl oxalate, ethyl acetoacetate, cyclohexyl acetate, 3-methoxy-butyl acetate, methyl acetoacetate, ethyl-3-ethoxypropionate, isopentyl propionate, propylene glycol monomethyl ether propionate, γ-butyrolactone, γ-valerolactone, δ-valerolactone, propylene carbonate, N-methyl pyrrolidone, cyclohexanone, and cycloheptanone. Of these, 4-hydroxy-4-methyl-2-pentanone (diacetone alcohol), 3-methyl-3-methoxy-1-butanol, 3-methoxy-3-methyl-butyl acetate, 3-methoxy-butyl acetate, and γ-butyrolactone are particularly preferable.

Examples of the solvent having a boiling point of less than 150° C. under atmospheric pressure include methyl acetate, ethyl acetate, isopropyl acetate, n-propyl acetate, butyl acetate, ethylene glycol monomethyl ether acetate, propylene glycol monomethyl ether acetate, propylene glycol monomethyl ether, propylene glycol monoethyl ether, ethylene glycol ethyl ether, ethylene glycol methyl ether, butanol, isobutanol, n-propyl alcohol, and ethyl acetate. Of these, propylene glycol monomethyl ether acetate and propylene glycol monomethyl ether are particularly preferable.

The composition that contains the siloxane resin (E) preferably further contains silica particles and may also contain other components. If the composition that contains the siloxane resin (E) further contains silica particles, it serves to allow the resin coated ultra-thin glass sheet to achieve both bending resistance and transparency at a high level. In the composition that contains the siloxane resin, it is preferable for the silica particles to account for 10 wt % or more and 40 wt % or less relative to the total solid content. Here, the total solid content referred to above means the total content of the other components than the solvent in the composition that contains the siloxane resin (E). If the silica particles account for 10 wt % or more relative to the total solid content, it serves to accelerate the crosslinking through the silanol condensation reaction of the siloxane resin (E) and the silica particles, which leads to an increased degree of crosslinking in the organic film (C) used for the present invention to allow the resin coated ultra-thin glass sheet to have a further improved bending resistance. It also acts to reduce the difference in refractive index between the ultra-thin glass sheet (A) and the organic film (C), which leads to a decrease in the unevenness that is attributed to variation in film thickness of the organic film (C). If the silica particles account for 40 wt % or less relative to the total solid content, it serves to produce an organic film (C) having a high bending resistance and strong adhesiveness.

In order to ensure a further increased transparency of the organic film (C) used for the present invention, it is preferable for the silica particles to have an average particle diameter of 1 to 200 nm, more preferably 1 to 70 nm. Here, the average particle diameter of the silica particles can be determined by dynamic light scattering. Specifically, a beam with a wavelength of 780 nm emitted from a semiconductor laser is applied to a silica particle dispersion liquid with a concentration 10 to 30 wt % and the scatted light is measured and subjected to frequency analysis by the FFT-heterodyne method to determine the average particle diameter.

Commercial products of silica particles include, for example, sicastar (manufactured by Corefront Corporation) and Reolosil (registered trademark) (manufactured by Tokuyama Corporation). Before use, these may be crushed or dispersed by a dispersing machine such as bead mill. Commercial products of silica particles dispersion liquids include, for example, IPA-ST, MIBK-ST, IPA-ST-L, IPA-ST-ZL, PGM-ST, and PMA-ST (all manufactured by Nissan Chemical Industries, Ltd.), Oscal (registered trademark) 101, Oscal 105, Oscal 106, and Cataloid (registered trademark)-S (all manufactured by JGC Catalysts and Chemicals Ltd.), and Quartron (registered trademark) PL-1-IPA, PL-1-TOL, PL-2L-PGME, PL-2L-MEK, PL-2L, and GP-2 L (all manufactured by Fuso Chemical Co., Ltd.). Two or more of these may be contained together.

It is preferable that the composition that contains the siloxane resin (E) also contain a photo-radical polymerization initiator because in that case, the combined use with the siloxane resin (E) that contains a radical polymerizable group serves to allow the degree of crosslinking in the organic film (C) used for the present invention to be increased through a photo-radical polymerization reaction, thereby achieving the production of a resin coated ultra-thin glass sheet having a further improved bending resistance.

In this case, in order to allow the reaction involving the radical polymerizable group to progress sufficiently to produce a resin coated ultra-thin glass sheet having a further improved bending resistance, the photo-radical polymerization initiator present in the composition that contains the siloxane resin (E) preferably accounts for 0.5 wt % or more, more preferably 1 wt % or more, relative to the total solid content. On the other hand, in order to increase the transparency of the organic film (C) used for the present invention, it is preferable for the photo-radical polymerization initiator to account for 20 wt % or less, more preferably 10 wt % or less, relative to the total solid content.

Examples of the photo-radical polymerization initiator include alkylphenone based photo-radical polymerization initiators such as α-aminoalkylphenone based photo-radical polymerization initiators and α-hydroxyalkylphenone based photo-radical polymerization initiators; acylphosphine oxide based photo-radical polymerization initiators; oxime ester based photo-radical polymerization initiators; benzophenone based photo-radical polymerization initiators; oxanthone based photo-radical polymerization initiators; imidazole based photo-radical polymerization initiators; benzothiazole based photo-radical polymerization initiators; benzoxazole based photo-radical polymerization initiators; carbazole based photo-radical polymerization initiators, triazine based photo-radical polymerization initiators; benzoate based photo-radical polymerization initiators; phosphorous based photo-radical polymerization initiators; and inorganic photo-radical polymerization initiators such as titanates. Two or more of these may be contained together.

Of these, α-aminoalkylphenone based photo-radical polymerization initiators, acylphosphine oxide based photo-radical polymerization initiators, oxime ester based photo-radical polymerization initiators, amino group-containing benzophenone based photo-radical polymerization initiators, and amino group-containing benzoate based photo-radical polymerization initiators are preferable from the viewpoint of increasing the degree of crosslinking in the organic film (C) used for the present invention to produce a resin coated ultra-thin glass sheet with a further improved bending resistance.

Examples of the α-aminoalkylphenone based photo-radical polymerization initiators include 2-methyl-[4-(methylthio)phenyl]-2-morpholinopropane-1-one, 2-dimethylamino-2-(4-methylbenzyl)-1-(4-morpholine-4-yl-phenyl)-butane-1-one, and 2-benzyl-2-dimethylamino-1-(4-morpholinophenyl)-butanone-1. Examples of the acylphosphine oxide based photo-radical polymerization initiators include 2,4,6-trimethylbenzoylphenylphosphine oxide, bis(2,4,6-timethylbenzoyl)-phenyl phosphine oxide, and bis(2,6-dimethoxybenzoyl)-(2,4,4-trimethylpentyl)-phosphine oxide. Examples of the oxime ester based photo-radical polymerization initiators include 1-phenyl-1,2-propanedione-2-(o-ethoxycarbonyl) oxime, 1,2-octanedione, 1-[4-(phenylthio)-2-(O-benzoyloxime)], 1-phenyl-1,2-butanedione-2-(o-methoxycarbonyl) oxime, 1,3-diphenylpropanetrione-2-(o-ethoxycarbonyl) oxime, and ethanone,1-[9-ethyl-6-(2-methylbenzoyl)-9H-carbazole-3-yl]-,1-(0-acetyl oxime). Examples of the amino group-containing benzophenone based photo-radical polymerization initiators include 4,4-bis(dimethylamino)benzophenone and 4,4-bis(diethylamino)benzophenone. Examples of the amino group-containing benzoate based photo-radical polymerization initiators include ethyl p-dimethylaminobenzoate, 2-ethylhexyl-p-dimethylaminobenzoate, and ethyl p-diethylaminobenzoate.

It is preferable that the composition that contains the siloxane resin (E) further include a compound that has two or more radical polymerizable groups. If it includes a compound that has two or more radical polymerizable groups, it will cause a radical polymerization reaction with the radical polymerizable group contained in the siloxane resin (E) and works to increase the degree of crosslinking in the organic film (C) used for the present invention to allow the resin coated ultra-thin glass sheet to have a further improved bending resistance.

Useful radical polymerizable groups include those listed above as examples of the radical polymerizable group present in the siloxane resin.

It is preferable for the compound that has two or more radical polymerizable groups to be a polyfunctional (meth)acrylate. The polyfunctional (meth)acrylate is a compound that has two or more (meth)acrylate groups and examples thereof include compounds having two (meth)acrylate groups such as 2,2-[9H-fluorene-9,9-diylbis(1,4-phenylene)bisoxy]diethanol di(meth)acrylate, ethylene glycol di(meth)acrylate, diethylene glycol di(meth)acrylate, trimethylolpropane tri(meth)acrylate, dimethylol tricyclodecane di(meth)acrylate, ethoxylated bisphenol A di(meth)acrylate, glycerin di(meth)acrylate, tripropylene glycol di(meth)acrylate, 1,3-butanediol di(meth)acrylate, neopentyl glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate; and other such as acrylic ester of tris(2-hydroxyethyl)isocyanuric acid, glycerin tri(meth)acrylate, penteerythritol tri(meth)acrylate, pentaerythritol tetra(meth)acrylate, pentaerythritol tri(meth)acrylate, pentaerythritol tetra(meth)acrylate, ethoxylated pentaerythritol tetra(meth)acrylate, dipentaerythritol hexa(meth)acrylate, tipentaerythritol hepta(meth)acrylate, tripentaerythritol octa (meth)acrylate, tetrapentaerythritol nona(meth)acrylate, tetrapentaerythrttol deca(meth)acrylate, pentapenteerythritol undeca(meth)acrylate, and pentapentaerythritol dodeca(meth)acrylate. Two or more of these may be contained together.

In the composition that contains the siloxane resin (E), such compounds having two or more radical polymerizable groups preferably account for 5 wt % or more, more preferably 10 wt % or more, relative to the total solid content in order to increase the degree of crosslinking in the organic film (C) to allow the resin coated ultra-thin glass sheet to have a further improved bending resistance. On the other hand, in order to increase the bendability of the organic film (C), it is preferable for the compounds having two or more radical polymerizable groups to account for 50 wt % or less, more preferably 30 wt % or less, relative to the total solid content.

The composition that contains the siloxane resin (E) may include a siloxane compound that has an oxetanyl group. If it includes a siloxane compound having an oxetanyl group, the oxetane ring will undergo a ring opening reaction to relax the stress in the organic film (C) and this serves to improve the adhesion between the ultra-thin glass sheet (A) and the organic film (C).

The siloxane compound having an oxetanyl group may be, for example, a compound as represented by the general formula (1) given below.

[Chemical Compound 1]

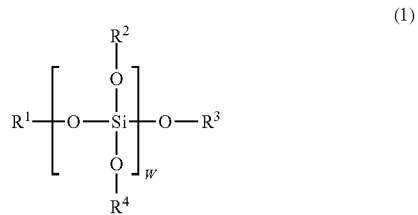

In the general formula (1) given above, $R^1$ to $R^4$ each denote a hydrogen atom, an alkyl group, a cycloalkyl group, or a group as represented by the general formula (2) given below. In the formula, at least one of $R^1$ to $R^4$ is a group as represented by the general formula (2) given below. Here, w is an integer of 1 to 10. From the viewpoint of reactivity, the alkyl group preferably has 1 to 6 carbon atoms and the cycloalkyl group preferably has 3 to 6 carbon atoms.

[Chemical Compound 2]

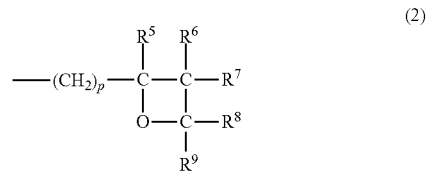

In general formula (2) given above, $R^5$ to $R^9$ each denote a hydrogen atom, a fluorine atom, an alkyl group having 1 to 4 carbon atoms, a phenyl group, or a perfluoroalkyl group having 1 to 4 carbon atoms. Here, p is an integer of 1 to 6.

The siloxane compound as represented by the general formula (1) can be produced by hydrolyzing an alkoxysilane compound having an oxetanyl group, along with an alkoxysilane compound having no oxetanyl group if required.

Examples of the alkoxysilane compound having an oxetanyl group include (oxetane-3-yl)methyl trimethoxysilane, (oxetane-3-yl)methyl triethoxysilane, (oxetane-3-yl)methyl-tri-n-propyl oxysilane, (oxetane-3-yl)methyl-tri-i-propyl oxysilane, (oxetane-3-yl)methyl triacetoxysilane, (oxetane-3-yl)methylmethyl dimethoxysilane, (oxetane-3-yl)methylmethyl dlethoxysilane, (oxetane-3-yl)methylmethyldi-n-propyl oxysllane, (oxetane-3-yl)methylmethyldi-i-propyl oxysilane, (oxetane-3-yl)methylmethyl diacetoxysilane, (oxetane-3-yl)methylethyl dimethoxysilane, (oxetane-3-yl) methylethyl diethoxysilane, (oxetane-3-yl)methylethyl-di-n-propyl oxysilane, (oxetane-3-yl)methylethyl-di-4-propyl oxysilane, (oxetane-3-yl)methylethyl diacetoxysilane, (oxetane-3-yl)methylphenyl dimethoxysilane, (oxetane-3-yl) methylphenyl diethoxysilane, (oxetane-3-yl)methylphenyl-di-n-propyl oxysilane, (oxetane-3-yl)methylphenyl-di-i-propyl oxysilane, (oxetane-3-yl)methylphenyl diacetoxysilane, di(oxetane-3-yl)methyl dimethoxysilane, di(oxetane-3-yl)methyl diethoxysilane, di(oxetane-3-yl) methyl-di-n-propyl oxysilane, di(oxetane-3-yl)methyl-di-i-propyl oxysilane, di(oxetane-3-yl)methyl diacetoxysilane, di(oxetane-3-yl)methylmethyl methoxysilane, di(oxetane-3-yl)methylmethyl ethoxysilane, di(oxetane-3-yl)methylmethyl-n-propyl oxysilane, di(oxetane-3-yl)methylmethyl-i- propyl oxysilane, di(oxetane-3-yl)methylmethyl acetoxysilane, di(oxetane-3-yl)methylethyl methoxysilane, di(oxetane-3-yl)methylethyl ethoxysilane, di(oxetane-3-yl)methylethyl-n-propyl oxysilane, di(oxetane-3-yl)methyl-ethyl-1-propyl oxysilane, di(oxetane-3-yl)methylethyl acetoxysilane, di(oxetane-3-yl)methylphenyl methoxysilane, di(oxetane-3-yl)methylphenyl ethoxysilane, di(oxetane-3-yl)methylphenyl-n-propyl oxysilane, di(oxetane-3-yl)methylphenyl-1-propyl oxysilane, di(oxetane-3-yl)methylphenyl acetoxysilane, tri(oxetane-3-yl)methyl methoxysilane, tri(oxetane-3-yl)methyl ethoxysilane, tri(oxetane-3-yl)methyl-n-propyl oxysilane, tri(oxetane-3-yl)methyl-i-propyl oxysilane, and tri(oxetane-3-yl)methyl acetoxysilane. Two or more of these may be used in combination.

Examples of the alkoxysilane compound having no oxetanyl group include tetramethoxysilane, tetraethoxysilane, methyl trimethoxysilane, methyl triethoxysilane, methyl tripropoxysilane, methyl triisopropoxysilane, ethyl trimethoxysilane, ethyl triethoxysilane, propyl triethoxysilane, butyl trimethoxysilane, cyclohexyl trimethoxysilane, cyclohexyl triethoxysilane, phenyl trimethoxysilane, phenyl triethoxysilane, dimethyl diethoxysilane, dimethyl diethoxysilane, diethyl dimethoxysilane, diethyl diethoxysilane, diphenyl dimethoxysilane, diphenyl diethoxysilane, methylphenyl dimethoxysilane, methylphenyl diethoxysilane, trimethyl silanol, triethyl silanol, tripropyl silanol, tributyl silanol, triphenyl silanol, trimethyl methoxysilane, timethyl ethoxysilane, triethyl methoxysilane, triethyl ethoxysilane, tripropyl methoxysilane, tripropyl ethoxysilane, trimethylsilyl acetate, trimethylsilyl benzoate, triethylsilyl acetate, triethylsilyl benzoate, benzyldimethyl methoxysilane, benzyldimethyl ethoxysilane, diphenylmethoxymethyl silane, diphenyl ethoxymethyl silane, acetyltriphenyl silane, ethoxytriphenyl silane, hexamethyl disiloxane, hexaethyldimethyl disiloxane, hexapropyl disiloxane, 1,3-dibutyl-1,1,3,3-tetramethyl disiloxane, 1,3-diphenyl-1,1,3,3-tetramethyl disiloxane, and 1,3-dimethyl-1,1,3,3-tetraphenyl disiloxane. Two or more of these may be used in combination.

Examples of the siloxane compound having an oxetanyl group include Arone Oxetane (registered trademark) OXT-191 (trade name, manufactured by Toagosei Co., Ltd.) (represented by the general formula (1) wherein $R^1$ to $R^4$ are each a (3-ethyl-3-oxetanyl)methyl group, and w is 5 in average) and compounds as represented by the general formula (3) or (6) given below. Two or more of these may be contained together.

[Chemical Compound 3]

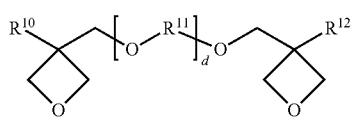

In general formula (3) given above, $R^{10}$ and $R^{12}$ each denote a hydrogen atom, a fluorine atom, an alkyl group having 1 to 6 carbon atoms, a fluoroalkyl group having 1 to 6 carbon atoms, an aryl group having 6 to 18 carbon atoms, a furyl group, or a thienyl group. $R^{11}$ is a group as represented by general formula (4) given below. Here, d is an integer of 0 to 3. The alkyl groups having 1 to 6 carbon atoms include, for example, the methyl group, ethyl group, propyl group, butyl group, pentyl group, and hexyl group. Examples of the fluoroalkyl group having 1 to 6 carbon atoms include trifluoromethyl group, perfluoroethyl group, and perfluoropropyl group. Examples of the aryl group having 6 to 18 carbon atoms include phenyl group and naphthyl group.

[Chemical Compound 4]

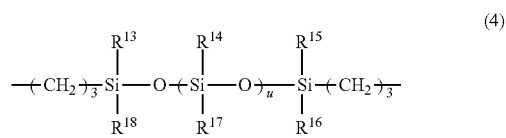

In the general formula (4) given above, $R^{13}$, $R^{15}$, $R^{16}$, and $R^{18}$ each denote an alkyl group having 1 to 4 carbon atoms or an aryl group having 6 to 18 carbon atoms, and $R^{14}$ and $R^{17}$ each denote an alkyl group having 1 to 4 carbon atoms, an aryl group having 6 to 18 carbon atoms, or a group as represented by the general formula (5) given below. Here, u is an integer of 0 to 200. When u is 2 or greater, the plurality of $R^{14}$'s and $R^{17}$'s may be identical to or different from each other.

[Chemical Compound 5]

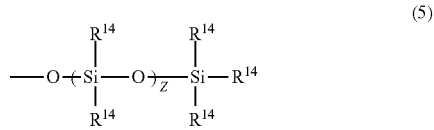

In the general formula (5) given above, $R^{19}$ to $R^{23}$ each denote an alkyl group having 1 to 4 carbon atoms or an aryl group having 6 to 18 carbon atoms. Here, Z is an integer of 0 to 100. When z is 2 or greater, the plurality of $R^{19}$'s and $R^{23}$'s may be identical to or different from each other.

[Chemical Compound 6]

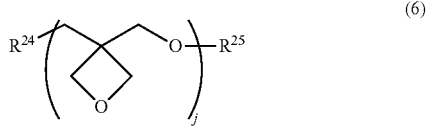

In general formula (6) given above, Ru denotes a hydrogen atom, a fluorine atom, an alkyl group having 1 to 6 carbon atoms, a fluoroalkyl group having 1 to 6 carbon atoms, an aryl group having 6 to 18 carbon atoms, a furyl group, or a thienyl group, and $R^2$ denotes a trivalent to decavalent organic group. For example, it may be a linear, branched, or a basket-like polysiloxane-containing group as represented by any of the general formulae (7) to (9) given below. In general formula (6), j is an integer of 3 to 10 that is equal to the valence of $R^{25}$.

[Chemical Compound 7]

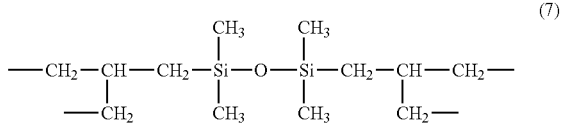

-continued

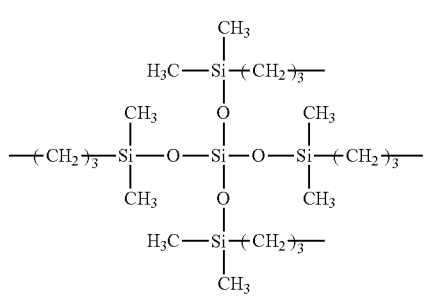
(8)

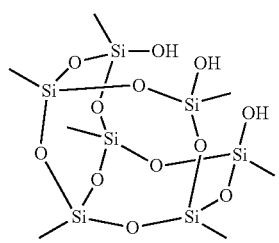
(9)

Examples of a basket-like oxetanyl group-containing siloxane compound as represented by the general formula (9) given above include silsesquioxane derivatives such as OX-SQ TX-100 and OX-SQ SI-20 (both trade names, manufactured by Toagosel Co., Ltd.).

In particular, those having a plurality of oxetanyl groups are preferable. If a plurality of oxetanyl groups is contained, the oxetane ring will undergo a ring opening reaction to relax the stress in the organic film (C) and this serves to improve the adhesion with the glass substrate.

In order to further relax the stress in the organic film (C) to enhance the adhesion, it is preferable that the oxetanyl group-containing siloxane compound account for 0.1 wt % or more, more preferably 0.5 wt % or more, relative to the total solid content in the composition that contains the siloxane resin (E). On the other hand, it is preferable that the oxetanyl group-containing siloxane compound account for 10 wt % or less, more preferably 6 wt % or less, relative to the total solid content in order to increase the stress in the organic film (C) to allow the resin coated ultra-thin glass sheet to have a further improved bending resistance.

The composition that contains the siloxane resin (E) may also include a metal chelate compound as represented by the general formula (10) given below. Since a metal chelate compound acts as a catalyst for the silanol condensation reaction of the siloxane resin (E), it serves to increase the degree of crosslinking in the organic film (C) and allow the resin coated ultra-thin glass sheet to have a further improved bending resistance.

[Chemical Compound 8]

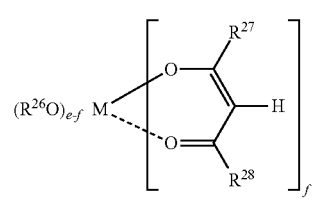
(10)

In the general formula (10) given above, M denotes a metal atom; $R^{26}$ denotes a hydrogen atom, an alkyl group, an aryl group, or an alkenyl group; and $R^{27}$ and $R^{28}$ each independently denote a hydrogen atom, an alkyl group, an aryl group, an alkenyl group, or an alkoxy group. Here, the alkyl group, aryl group, alkenyl group, and alkoxy group may be substituted by a substituent group. Furthermore, e is the valence of the metal atom M, and f is an integer of 0 to e. From the viewpoint of reactivity, e-f is preferably 0.

From the viewpoint of transparency of the organic film (C), preferable examples of the metal atom M include titanium, zirconium, aluminum, zinc, cobalt, molybdenum, lanthanum, barium, strontium, magnesium, and calcium, of which zirconium and aluminum are more preferable.

Examples of $R^{26}$ include hydrogen, methyl group, ethyl group, n-propyl group, isopropyl group, n-butyl group, sec-butyl group, n-pentyl group, n-hexyl group, n-heptyl group, n-octyl group, n-nonyl group, n-decyl group, n-octadecyl group, phenyl group, vinyl group, allyl group, and oleyl group.

Examples of $R^{27}$ and $R^{28}$ include hydrogen, methyl group, ethyl group, n-propyl group, Isopropyl group, n-butyl group, sec-butyl group, t-butyl group, phenyl group, vinyl group, methoxy group, ethoxy group, n-propoxy group, isopropoxy group, n-butoxy group, sec-butoxy group, n-pentyl group, n-hexyl group, n-heptyl group, n-octyl group, n-nonyl group, n-decyl group, n-octadecyl group, and benzyloxy group.

Examples of a zirconium chelate compound that contains zirconium as the metal atom M include zirconium tetra-n-propoxide, zirconium tetra-n-butoxide, zirconium tetra-sec-butoxide, zirconium tetraphenoxide, zirconium tetraacetyl acetonate, zirconium tetra(2,2,6,6-tetramethyl-3,5-heptanedionate), zirconium tetramethyl acetoacetate, zirconium tetraethyl acetoacetate, zirconium tetramethyl malonate, zirconium tetraethyl malonate, zirconium tetrabenzoyl acetonate, zirconium tetradibenzoyl methanate, zirconium mono-n-butoxyacetyl acetonate bis(ethyl acetoacetate), zirconium mono-n-butoxyethyl acetoacetate bis(acetyl acetonate), zirconium mono-n-butoxytris(acetyl acetonate), zirconium mono-n-butoxytris(acetyl acetonate), zirconium di(n-butoxy)bis(ethyl acetoacetate), zirconium di(n-butoxy)bis (acetyl acetonate), zirconium di(n-butoxy)bis(ethyl malonate), zirconium di(n-butoxy)bis(benzoyl acetonate), and zirconium di(n-butoxy)bis(dibenzoyl methanate).

Examples of an aluminum chelate compound that contains aluminum as the metal atom M include aluminum tris-isopropoxide, aluminum tris-n-propoxide, aluminum tris-sec-butoxide, aluminum tris-n-butoxide, aluminum tris-phenoxide, aluminum tris-acetyl acetonate, aluminum tris(2,2,6,6-tetramethyl-3,5-heptane dionate), aluminum trisethyl acetoacetate, aluminum trismethyl acetoacetate, aluminum trismethyl malonate, aluminum trisethyl malonate, aluminum ethyl acetate di(isopropoxide), aluminum acetyl acetonate di(isopropoxide), aluminum methyl acetoacetate di(isopropoxide), aluminum octadecyl acetoacetate di(isopropylate), and aluminum monoacetyl acetonate bis (ethyl acetoacetate).

In particular, from the viewpoint of the solubility in various solvents and stability of the compounds, preferable are zirconium tetra-normal-propoxide, zirconium tetra-normal-butoxide, zirconium tetraphenoxide, zirconium tetraacetyl acetonate, zirconium tetra(2,2,6,6-tetramethyl-3,5-heptane dionate), zirconium tetramethyl malonate, zirconium tetraethyl malonate, zirconium tetraethyl acetoacetate, zirconium di-normal-butoxy bis(ethyl acetoacetate), zirconium mono-normal-butoxyacetyl acetonate bis(ethyl acetoacetate), aluminum trisacetyl acetonate, aluminum tris (2,2,6,6-tetramethyl-3,5-heptane dionate), aluminum trisethyl acetoacetate, aluminum trismethyl acetoacetate, aluminum trismethyl malonate, aluminum trisethyl malonate, aluminum ethyl acetate di(isopropoxide), aluminum acetyl acetonate di(isopropoxide), aluminum methyl acetoacetate di(isopropoxide), aluminum octadecyl acetoacetate di(isopropylate), and aluminum monoacetyl acetonate bis(ethyl acetoacetate).

In the composition that contains the siloxane resin (E), the metal chelate compound preferably accounts for 0.1 wt % or more, more preferably 0.5 wt % or more, relative to the total solid content in order to increase the degree of crosslinking in the organic film (C) to allow the resin coated ultra-thin glass sheet to have a further improved bending resistance. On the other hand, from the viewpoint of long-term stability of the composition that contains the siloxane resin (E), the metal chelate compound preferably accounts for 10 wt % or less, more preferably 7 wt % or less, relative to the total solid content.

The composition that contains the siloxane resin (E) may also include an adhesion promoter. If an adhesion promoter is included, it serves to further improve the adhesion between the organic film (C) and the ultra-thin glass sheet (A).

Examples of such an adhesion promoter include silane coupling agents having functional groups such as vinyl group, epoxy group, styryl group, (meth)acryloxy group, and amino group. More specifically, they preferably include vinyl trimethoxysilane, vinyl triethoxysilane, vinyl tris(2-methoxyethoxy) silane, 3-glycidoxypropyl trimethoxysilane, 3-glycidoxypropyl triethoxysilane, 3-glycidoxypropylmethyl dimethoxysilane, 3-glycidoxypropylmethyl diethoxysilane, 2-(3,4-epoxycyclohexyl)ethyl trimethoxysilane, p-styryl trimethoxysilane, 3-methacryloxypropyl trimethoxysilane, 3-acryloxypropyl trimethoxysilane, 3-aminopropyl trimethoxysilane, 3-aminopropyl triethoxysilane, N-(2-aminoethyl)-3-aminopropylmethyl dimethoxysilane, N-(2-aminoethyl)-3-aminopropyl trimethoxysilane, 3-triethoxysilyl-N-(1,3-dimethyl-butylidene)propyl amine, 3-mercaptopropyl trimethoxysilane, 3-ureidopropyl triethoxysilane, 3-isocyanatepropyl triethoxysilane, and p-styryl trimethoxysilane.

In the composition that contains the siloxane resin (E), it is preferable for the adhesion promoter to account for 0.1 wt % or more, more preferably 0.5 wt % or more, relative to the total solid content in order to further improve the adhesion between the organic film (C) and the ultra-thin glass sheet (A). On the other hand, from the viewpoint of long-term stability of the composition that contains the siloxane resin (E), it preferably accounts for 10 wt % or less, more preferably 5 wt % or less, relative to the total solid content.

The composition that contains the siloxane resin (E) may further include a crosslinking agent selected from various useful ones in order to promote or facilitate its crosslinking. Examples of such a crosslinking agent include nitrogen-containing organic substances, silicone resin crosslinking agents, isocyanate compounds, polymers thereof, methylolated melamine derivatives, and methylolated urea derivatives. Two or more of these may be contained together. In particular, methylolated melamine derivatives and methylolated urea derivatives are preferable from the viewpoint of crosslinkability and long-term stability.

The curing of the siloxane resin (E) can be promoted by an acid and accordingly, a curing catalyst such as thermal acid generating agent and photo acid generating agent may be included in the composition that contains the siloxane resin (E). Examples of such a thermal acid generating agent include SI-60, SI-80, SI-100, SI-110, SI-145, SI-150, SI-60L, SI-80L, SI-100L, SI-110L, SI-145L, SI-150L, SI-160L, and SI-180L (all manufactured by Sanshin Chemical Industry Co., Ltd.) as well as 4-hydroxyphenyldimethylsulfonium trifluoromethanesulfonate, benzyl-4-hydroxyphenylmethylsulfonium trifluoromethanesulfonate, 2-methylbenzyl-4-hydroxyphenylmethylsulfonium trifluoromethanesulfonate, 4-acetoxyphenyldimethylsulfonium trifluoromethanesulfonate, 4-acetoxyphenylbenzylmethylsulfonium trifluoromethanesulfonate, 4-methoxycarbonyloxyphenyldimethylsulfonium trifluoromethanesulfonate, and benzyl-4-methoxycarbonyloxyphenylmethylsulfonium trifluoromethanesulfonate.

Examples of the photo acid generating agent include SI-100, SI-101, SI-105, SI-106, SI-109, PI-105, PI-106, PI-109, NAI-100, NAI-1002, NAI-1003, NAI-1004, NAI-101, NAI-105, NAI-106, NAI-109, NDI-101, NDI-105, NDI-106, NDI-109, PAI-01, PAI-101, PAI-106, PAI-1001 (all manufactured by Midori Kagaku Co., Ltd.), SP-077, SP-082 (both manufactured by Adeka Corporation), TPS-PFBS (manufactured by Toyo Gosei Co., Ltd.), MDT (manufactured by Heraeus K.K.), WPAG-281, WPAG-336, WPAG-339, WPAG-342, WPAG-344, WPAG-350, WPAG-370, WPAG-372, WPAG-449, WPAG-469, WPAG-505, and WPAG-506 (all manufactured by Wako Pure Chemical Industries, Ltd.).

In the composition that contains the siloxane resin (E), the curing catalyst such as thermal acid generating agent and photo acid generating agent preferably account for 0.1 wt % or more, more preferably 0.3 wt % or more, relative to the total solid content in order to increase the degree of crosslinking in the organic film (C) to allow the resin coated ultra-thin glass sheet to have a further improved bending resistance. On the other hand, from the viewpoint of long-term stability of the composition that contains the siloxane resin (E), the curing catalyst such as thermal acid generating agent and photo acid generating agent preferably accounts for 5 wt % or less, more preferably 3 wt % or less, relative to the total solid content.

The composition that contains the siloxane resin (E) may also include a polymerization terminator. The inclusion of a polymerization terminator serves to improve the long-term stability. Examples of such a polymerization terminator include phenol, catechol, resorcinol, hydroquinone, 4-t-butylcatechol, 2,6-di(t-butyl)-p-cresol, phenothiazine, and 4-methoxyphenol.

In the composition that contains the siloxane resin (E), the polymerization terminator preferably accounts for 0.01 wt % or more, more preferably 0.1 wt % or more, relative to the total solid content. On the other hand, in order to avoid the inhibition of crosslinking in the organic film (C), it preferably accounts for 5 wt % or less, more preferably 1 wt % or less, relative to the total solid content.

The composition that contains the siloxane resin (E) may also include an ultraviolet absorber. The inclusion of a ultraviolet absorber serves to improve the light resistance of the organic film (C). From the viewpoint of transparency and non-coloring property, the ultraviolet absorber is preferably a benzotriazole based compound, a benzophenone based compound, or a triazine based compound.

Examples of such a benzotriazole based compound include 2-(2Hbenzotriazole-2-yl)phenol, 2-(2H-benzotriazole-2-yl)-4,6-t-pentylphenol, 2-(2Hbenzotriazole-2-yl)-4-(1,1,3,3-tetramethylbutyl)phenol, 2(2H-benzotriazole-2-yl)-6-dodecyl-4-methylphenol, and 2-(2'-hydroxy-5'-methacryloxyethylphenyl)-2H-benzotrazole.

Examples of such a benzophenone based compound include 2-hydroxy-4-methoxybenzophenone.

Examples of such a triazine based compound include 2-(4,6-diphenyl-1,3,5-triazine-2-yl)-5-[(hexyl)oxy]phenol.

In the composition that contains the siloxane resin (E), it is preferable for the ultraviolet absorber to account for 10 wt % or less, more preferably 5 wt % or less, relative to the total solid content in order to improve the adhesion between the organic film (C) and the ultra-thin glass sheet (A).

The composition that contains the siloxane resin (E) may also include a surfactant. The inclusion of a surfactant serves to improve the flowability during coating. Examples of such a surfactant include fluorine based surfactants; silicone based surfactants; fluorine-containing heat-decomposable surfactants; polyether modified siloxane based surfactants; polyalkylene oxide based surfactants; poly(meth)acrylate based surfactants; anionic surfactants such as ammonium lauryl sulfate and triethanolamine polyoxyethylene alkyl ether sulfate; cationic surfactants such as stearylamine acetate and lauryl trimethylammonium chloride; amphoteric surfactants such as lauryl dimethylamine oxide and lauryl carboxymethyl hydroxyethyl imidazolium betaine; and non-ionic surfactants such as polyoxyethylene lauryl ether, polyoxyethylene stearyl ether, and sorbitan monostearate. Two or more of these may be contained together.

In particular, fluorine based surfactants, silicone based surfactants, fluorine-containing heat-decomposable surfactants, and polyether modified siloxane based surfactants are preferable from the viewpoint of suppressing coating defects such as cissing, reducing the surface tension, and preventing uneven drying of the coating film, of which fluorine-containing heat-decomposable surfactants are more preferable.

Commercial products of fluorine based surfactants include, for example, Megafac (registered trademark) F142D, F172, F173, F183, F445, F470, F475, and F477 (all manufactured by DIC Corporation), and NBX-15 and FTX-218 (manufactured by Neos Co., Ltd.). Commercial products of silicone based surfactants include, for example, BYK (registered trademark)-333, BYK-301, BYK-331, BYK-345, and BYK-307 (manufactured by BYK Japan KK). Commercial products of fluorine-containing heat-decomposable surfactants include, for example, Megafac (registered trademark) DS-21 (manufactured by DIC Corporation). Commercial products of polyether modified siloxane based surfactants include, for example, BYK (registered trademark)-345, BYK-346, BYK-347, BYK-348, and BYK-349 (all manufactured by all BYK Japan KK), and Silface (registered trademark) SAG002, SAG005, SAG0503A, and SAG008 (all manufactured by Nissin Chemical Industry Co., Ltd.).

Next, production methods for a composition that contains a siloxane resin (E) are described below.

To produce a composition that contains a siloxane resin (E), a generally known method is to mix a siloxane resin (E) with appropriate amounts of other materials such as silica particles, a photo-radical polymerization initiator, a compound having two or more radical polymerizable groups, and a solvent as required, followed by stirring them.

In addition, an organic film having a hardness different from those of the hard coat layer and the organic film (B) may be formed between the organic film (B) and the hard coat layer.

The resin coated ultra-thin glass according to the present invention can be suitably used for the production of cover glass sheets of display devices for smart phones and tablet PCs, on-vehicle display devices, and instrument panels in which an organic buffer film (B) is provided on the top face.

Here, in the case where the resin coated ultra-thin glass sheet is used as the front-side cover glass of the display device, the top face referred to above is the surface that faces the user and can be touched by fingers etc.

In the case where the resin coated ultra-thin glass sheet is used as the front-side cover glass of the display device, the face that cannot be touched by the user is referred to as the back face.

EXAMPLES

The present invention will now be illustrated in more detail with reference to examples and comparative examples, but the invention should not be construed as being limited to these examples.
(Evaluation Methods)
<Impact Resistance>

An OCA sheet (trade name "OPTERIA (registered trademark) MO-3017", manufactured by LINTEC Corporation) having a thickness of 50 µm is attached on the surface (back face) of an organic film (C) formed on an ultra-thin glass sheet (A). Next, the top face of the OCA sheet was attached to an SUS304 plate with a thickness of 10 mm and an ultra-thin glass sheet (A) was disposed in such a manner that the SUS304 underlay them.

Then, a ballpoint pen with a weight of 5.7 g and a refill diameter of 0.7 mm was dropped from a predetermined height to the organic film (B) (top face) of the ultra-thin glass sheet (A), and the ultra-thin glass sheet was observed to see if it suffered cracking. If cracking was not found, the same procedure was repeated from higher positions to determine the smallest height (PT1) to cause cracking of the ultra-thin glass sheet, and an evaluation was made according to the criteria given below.
⊚: 15≤PT1
○: 5≤PT1<15
x: PT1<5
<Bending Resistance>

An organic film (C) was formed on an ultra-thin glass sheet (A) and they were held with the former facing downward and subjected to test using an endurance testing machine (DMLHB, manufactured by Yuasa System Co., Ltd.) to determine the number of times (BT1) that breakage or cracking in the glass or organic film occurred when the curvature radius (R) was 2 mm. The test procedure was repeated 10,000 times at maximum and an evaluation was made according to the criteria given below.
⊚: BT1=10,000 (no occurrence of breakage or cracking in the glass or organic film)
○: 1,000≤BT1<10,000
x: BT1<1,000
(Yellow Index of Film)

An organic film (B) was prepared as described in each Example and Comparative example using a non-alkali glass sheet with a thickness of 0.5 mm instead of the ultra-thin glass sheet.

The light transmittance of the organic film (B) formed on the non-alkali glass sheet was measured in the measuring wavelength range of 380 nm to 780 nm using an ultraviolet-visible spectrophotometer (UV-2600, manufactured by Shimadzu Corporation). The measured light transmittance was used to determine the yellow index of the transmitted light from a D65 light source. It can be said that a smaller yellow index (YI) is more preferable.
<Pencil Hardness>

A resin coated glass sheet was prepared as described in each Example and Comparative example using a non-alkali glass sheet with a thickness of 0.5 mm instead of the ultra-thin glass sheet. A pencil with a predetermined hardness, held at an angle of 45°, was moved under a load of 750 g along the surface of the organic film (B) (top face) on the non-alkali glass sheet while observing the surface to see if it suffered flaws. Its pencil hardness was determined based on the observation.

(Synthesis of Siloxane Resin (PS-1))

In a 500 ml three-necked flask, 47.67 g (0.35 mol) of methyl trimethoxysilane, 39.66 g (0.20 mol) of phenyl trimethoxysilane, 26.23 g (0.10 mol) of 3-trimethoxysilyl propylsuccinic anhydride, 82.04 g (0.35 mol)) of 3-acryloxypropyl trimethoxysilane, and 182.88 g of diacetone alcohol (hereinafter referred to as DAA) were fed and, while stirring in an oil bath at 40° C., an aqueous phosphoric acid solution prepared by dissolving 0.391 g (accounting for 0.2 part by weight relative to the monomers fed) of phosphoric acid in 55.8 g of water was dropped over 10 minutes through a dropping funnel. After stirring at 40° C. for 1 hour, additional stirring was performed for 1 hour in the oil bath set at a temperature of 70° C., followed by heating the oil bath to reach 115° C. in 30 minutes. One hour after the start of temperature rise, the internal temperature in the solution reached 100° C. and heating was continued further while stirring for additional 2 hours (the internal temperature maintained at 100° C. to 110° C.). A total of 120 g of methanol and water was distilled out as by-products from the reaction. DAA was added to the resulting solution of a siloxane resin in DAA until the polymer concentration reached 40 wt % to prepare a solution of a siloxane resin (PS-1). Here, the weight-average molecular weight (hereinafter referred to as Mw) of the resulting siloxane resin (PS-1) was measured by GPC and found to be 5,000 (in terms of polystyrene).

(Synthesis of Siloxane Resin (PS-2))

In a 500 ml three-necked flask, 54.48 g (0.40 mol) of methyl trimethoxysilane, 99.15 g (0.50 mol) of phenyl trimethoxysilane, 24.64 g (0.10 mol) of 2-(3,4-epoxycyclohexyl)ethyl trimethoxysilane, and 163.35 g of DAA were fed and, while stirring in an oil bath at 40° C., an aqueous phosphoric acid solution prepared by dissolving 0.535 g (accounting for 0.3 part by weight relative to the monomers fed) of phosphoric acid in 54.0 g of water was dropped over 10 minutes through a dropping funnel. After stirring at 40° C. for 1 hour, additional stirring was performed for 1 hour in the oil bath set at a temperature of 70° C., followed by heating the oil bath to reach 115° C. in 30 minutes. One hour after the start of temperature rise, the internal temperature in the solution reached 100° C. and heating was continued further while stirring for additional 2 hours (the internal temperature maintained at 100° C. to 110° C.). A total of 120 g of methanol and water was distilled out as by-products from the reaction. DAA was added to the resulting solution of a siloxane resin in DAA until the polymer concentration reached 40 wt % to prepare a solution of a siloxane resin (PS-2). Here, the Mw of the resulting siloxane resin (PS-2) was measured by GPC and found to be 5,000 (in terms of polystyrene).

(Preparation of Composition Containing Siloxane Resin (GR-1))

Under a yellow light, 1.52 g of phenyl bis(2,4,6-trimethylbenzoyl)phosphine oxide (trade name "Omnirad (registered trademark) 819", manufactured by IGM) and 1.30 g of zirconium tetraacetylacetonato (trade name "Orgatix (registered trademark) ZC-150", manufactured by Matsumoto Fine Chemical Co. Ltd.) were dissolved in a mixed solvent of 23.96 g of DAA, 1.53 g of propylene glycol monomethyl ether acetate (hereinafter referred to as PGMEA), and 14.80 g of 3-methyl-3-methoxy-1-butanol (hereinafter referred to as MMB), followed by adding 0.98 g of a siloxane compound having an oxetanyl group (Arone Oxetane (registered trademark) OXT-191, manufactured by Toagosei Co., Ltd.), 0.43 g of 3-aminopropyl trimethoxysilane (trade name "KBM-903", manufactured by Shin-Etsu Chemical Co., Ltd.), 4.35 g of acrylate of tris(2-hydroxyethyl)isocyanuric acid (trade name "Aronix (registered trademark) M-315", manufactured by Toagosei Co., Ltd.), 28.99 g of a 30 wt % dispersion liquid of silica particles in PGMEA (average particle diameter=20 to 30 nm, trade name "PMA-ST", manufactured by Nissan Chemical Industries, Ltd.), 21.74 g of a siloxane resin (PS-1) solution, 0.20 g (corresponding to a concentration of 100 ppm) of a 5 wt % PGMEA solution of a fluorine-containing heat-decomposable surfactant (trade name "DS-21", manufactured by DIC Corporation), 0.20 g (corresponding to a concentration of 100 ppm) of a 5 wt % PGMEA solution of a silicone modified acrylic surfactant (trade name "BYK (registered trademark)-3550", manufactured by BYK-Chemie), which were then stirred. Subsequently, filtration was performed using a filter of 1.00 µm to prepare a siloxane resin-containing composition (GR-1) having a solid content of 26 wt %.

(Preparation of Composition Containing Siloxane Resin (GR-2))

Under a yellow light, 0.36 g of trifluoromethane sulfonic acid ester (trade name "MDT", manufactured by Heraeus K.K.) was dissolve in a mixed solvent of 4.00 g of DAA, 8.80 g of PGMEA, and 22.20 g of 3-methoxy-3-methyl-1-butyl acetate (boiling point=188° C.), followed by adding 0.54 g of a silane modified isocyanuric acid ester based compound (trade name "KBM-9659", manufactured by Shin-Etsu Chemical Co., Ltd.), 23.89 g of a 30 wt % dispersion liquid of silica particles in PGMEA (average particle diameter=20 to 30 nm, trade name "PMA-ST", manufactured by Nissan Chemical Industries, Ltd.), 39.82 g of a solution of the siloxane resin (PS-2), 0.20 g (corresponding to a concentration of 100 ppm) of a 5 wt % PGMEA solution of a fluorine-containing heat-decomposable surfactant (trade name "DS-21", manufactured by DIC Corporation), and 0.20 g (corresponding to a concentration of 100 ppm) of a 5 wt % PGMEA solution of a silicone modified acrylic surfactant (trade name "BYK (registered trademark)-3550", manufactured by BYK-Chemie), which were then stirred. Subsequently, filtration was performed using a filter of 1.00 µm to prepare a siloxane resin-containing composition (GR-2) having a solid content of 26 wt %.

(Preparation of Composition Containing Thermoplastic Resin (GB-1))

In a 500 mL three-necked flask, 15.00 g of a thermoplastic polyester resin (trade name "VYLON (registered trademark) 200", manufactured by Toyobo Co., Ltd.) (hereinafter referred to as VYLON 200) and 84.90 g of PGMEA were fed, followed by mixing and stirring them in an oil bath at 60° C. until VYLON 200 was dissolved. To the resulting solution of VYLON 200 in PGMEA, 0.10 g (corresponding to a concentration of 50 ppm) of a 5 wt % PGMEA solution of a fluorine-containing heat-decomposable surfactant (trade name "DS-21", manufactured by DIC Corporation) was added and stirred. Subsequently, filtration was performed using a filter of 1.00 µm to prepare a thermoplastic resin-containing composition (GB-1) having a solid content of 15 wt %.

Example 1

One surface (back face) of a chemically reinforced ultra-thin glass sheet (trade name "Dinorex (registered trademark)

T2X-1", manufactured by Nippon Electric Glass Co., Ltd.) with a thickness of 50 μm, which was used as the substrate, was spray-coated with the siloxane resin-containing composition (GR-1) using a spray coating machine (trade name "rCoater (registered trademark) ES1533", manufactured by Asahi Sunac Corporation) and prebaked on a hot plate at 100° C. for 2 minutes to prepare a prebaked film. Subsequently, it was exposed to 500 mJ/cm$^2$ (in terms of i-line) of light using a light exposure machine XG-5000, manufactured by Dainippon Screen Mfg. Co., Ltd., and then it was cured in a hot air oven at 180° C. for 40 minutes to prepare an organic film (C-1), which had a film thickness of 5 μm.

Next, the other surface (top face) of the ultra-thin glass sheet, that is, the surface that was not covered by the organic film (C-1), was spray-coated with the thermoplastic resin-containing composition (GB-1) using a spray coating machine and prebaked on a hot plate at 90° C. for 6 minutes to prepare a prebaked film. Subsequently, it was cured in a hot air oven at 210° C. for 40 minutes to prepare an organic film (B-1), which had a film thickness of 20 μm.

Then, the surface of the organic film (B-1) was spray-coated with a hard coat material (trade name "Lioduras (registered trademark) LCH2391", manufactured by Toyochem Co., Ltd.) and prebaked on a hot plate at 80° C. for 1 minute to prepare a prebaked film. Subsequently, it was exposed to 1,500 mJ of light using a light exposure machine (UVC-1212S1WF01, manufactured by Ushio Inc.) to form a hard coat layer (H-1) of 7 μm, thereby producing a resin coated ultra-thin glass sheet (SG-1). Results of evaluation performed by the methods described above are given in Table 2.

Example 2

Except that the formation of a hard coat layer was omitted, the same procedure as in Example 1 was carried out to produce a resin coated ultra-thin glass sheet (SG-2). Results of evaluation performed by the methods described above are given in Table 2.

Example 3

Except that an organic film (C-2) with a film thickness of 5 μm was formed using the siloxane resin-containing composition (GR-2), the same procedure as in Example 1 was carried out to produce a resin coated ultra-thin glass sheet (SG-3). Results of evaluation performed by the methods described above are given in Table 2.

Example 4

An organic film (B-2) with a film thickness of 40 μm was prepared by appropriately controlling the spraying rate and discharge rate in the step for forming the organic film (B-1). Except for changing the film thickness of the organic film (B-1), the same procedure as in Example 1 was carried out to produce a resin coated ultra-thin glass sheet (SG-4). Results of evaluation performed by the methods described above are given in Table 2.

Example 5

Except for replacing VYLON 200 with another thermoplastic polyester resin (trade name "VYLON (registered trademark) 600", manufactured by Toyobo Co., Ltd.), the same procedure as for GB-1 was carried out to prepare a thermoplastic resin-containing composition (GB-2).

Except for forming an organic film (B-3) using GB-2 prepared above, the same procedure as in Example 1 was carried out to produce a resin coated ultra-thin glass sheet (SG-5). Results of evaluation performed by the methods described above are given in Table 2.

Example 6

Except for replacing VYLON 200 with a vinyl chloride-vinyl acetate copolymer resin (trade name "SOLBIN (registered trademark) TA-5R", manufactured by Nissin Chemical Industry Co., Ltd.), the same procedure as for GB-1 was carried out to prepare a thermoplastic resin-containing composition (GB-3).

Except for forming an organic film (B-4) using GB-3 prepared above, the same procedure as in Example 1 was carried out to produce a resin coated ultra-thin glass sheet (SG-6). Results of evaluation performed by the methods described above are given in Table 2.

Example 7

Except for replacing VYLON 200 with a (meth)acrylate resin (trade name "Hi-pearl (registered trademark) M-4006", manufactured by Negami Kogyo Co., Ltd.), the same procedure as for GB-1 was carried out to prepare a thermoplastic resin-containing composition (GB-4).

Except for forming an organic film (B-5) using GB-4 prepared above, the same procedure as in Example 1 was carried out to produce a resin coated ultra-thin glass sheet (SG-7). Results of evaluation performed by the methods described above are given in Table 2.

Example 8

Except for replacing VYLON 200 with another thermoplastic polyester resin (trade name "VYLON (registered trademark) GK-360", manufactured by Toyobo Co., Ltd.), the same procedure as for GB-1 was carried out to prepare a thermoplastic resin-containing composition (GB-6).

Except for forming an organic film (B-8) using GB-6 prepared above, the same procedure as in Example 1 was carried out to produce a resin coated ultra-thin glass sheet (SG-12). Results of evaluation performed by the methods described above are given in Table 2.

Example 9

Except for replacing VYLON 200 with another thermoplastic polyester resin (trade name "VYLON (registered trademark) 270", manufactured by Toyobo Co., Ltd.), the same procedure as for GB-1 was carried out to prepare a thermoplastic resin-containing composition (GB-7).

Except for forming an organic film (B-9) using GB-7 prepared above, the same procedure as in Example 1 was carried out to produce a resin coated ultra-thin glass sheet (SG-13). Results of evaluation performed by the methods described above are given in Table 2.

Example 10

Except for replacing VYLON 200 with another thermoplastic polyester resin (trade name "VYLON (registered trademark) GK-880", manufactured by Toyobo Co., Ltd.), the same procedure as for GB-1 was carried out to prepare a thermoplastic resin-containing composition (GB-8).

Except for forming an organic film (B-10) using GB-8 prepared above, the same procedure as in Example 1 was carried out to produce a resin coated ultra-thin glass sheet (SG-14). Results of evaluation performed by the methods described above are given in Table 2.

Example 11

Except for using 13.50 g of VYLON 200 and 1.50 g of a thermosetting urethane acrylate (trade name "NK Oligo (registered trademark) U-6LPA", manufactured by Shin-Nakamura Chemical Co., Ltd.) (double bond equivalent weight 127 g/mol) (hereinafter referred to as U-6LPA), the same procedure as for GB-1 was carried out to prepare a thermoplastic resin-containing composition (GB-9).

Except for forming an organic film (B-11) using GB-9 prepared above, the same procedure as in Example 1 was carried out to produce a resin coated ultra-thin glass sheet (SG-15). Results of evaluation performed by the methods described above are given in Table 2.

Example 12

Except that the formation of a hard coat layer was omitted, the same procedure as in Example 11 was carried out to produce a resin coated ultra-thin glass sheet (SG-16). Results of evaluation performed by the methods described above are given in Table 2.

Example 13

Except for using 12.00 g of VYLON 200 and 3.00 g of U-6LPA, the same procedure as for GB-1 was carried out to prepare a thermoplastic resin-containing composition (GB-10).

Except for forming an organic film (B-12) using GB-10 prepared above, the same procedure as in Example 1 was carried out to produce a resin coated ultra-thin glass sheet (SG-17). Results of evaluation performed by the methods described above are given in Table 2.

Example 14

Except for using 10.50 g of VYLON 200 and 4.50 g of U-6LPA, the same procedure as for GB-1 was carried out to prepare a thermoplastic resin-containing composition (GB-11).

Except for forming an organic film (B-13) using GB-11 prepared above, the same procedure as in Example 1 was carried out to produce a resin coated ultra-thin glass sheet (SG-18). Results of evaluation performed by the methods described above are given in Table 2.

Example 15

Except for replacing U-6LPA with another thermosetting urethane acrylate (trade name "NK Oligo (registered trademark) UA-122P", manufactured by Shin-Nakamura Chemical Co., Ltd.) (double bond equivalent weight 550 g/mol), the same procedure as for GB-9 was carried out to prepare a thermoplastic resin-containing composition (GB-12).

Except for forming an organic film (B-14) using GB-12 prepared above, the same procedure as in Example 1 was carried out to produce a resin coated ultra-thin glass sheet (SG-19). Results of evaluation performed by the methods described above are given in Table 2.

Example 16

Except for replacing U-6LPA with another thermosetting urethane acrylate (trade name "NK Oligo (registered trademark) U-2HA", manufactured by Shin-Nakamura Chemical Co., Ltd.) (double bond equivalent weight 200 g/mol), the same procedure as for GB-9 was carried out to prepare a thermoplastic resin-containing composition (GB-13).

Except for forming an organic film (B-15) using GB-13 prepared above, the same procedure as in Example 1 was carried out to produce a resin coated ultra-thin glass sheet (SG-20). Results of evaluation performed by the methods described above are given in Table 2.

Comparative Example 1

A resin coated ultra-thin glass sheet that did not have an organic film (B), organic film (C), or hard coat layer was subjected to evaluation by the methods described above. Results are given in Table 2.

Comparative Example 2

Except for forming the organic film (B-1), the same procedure as in Example 1 was carried out to produce a resin coated ultra-thin glass sheet (SG-8). Results of evaluation performed by the methods described above are given in Table 2.

Comparative Example 3

An organic film (B-6) of a siloxane resin-containing composition (GR-1) with a film thickness of 5 μm was formed on the top face of an ultra-thin glass sheet by the same procedure as for the organic film (C-1). Except for the formation of B-6, the same procedure as in Example 1 was carried out to produce a resin coated ultra-thin glass sheet (SG-9). Results of evaluation performed by the methods described above are given in Table 2.

Comparative Example 4

Except that the formation of the organic film (C-1) was omitted, the same procedure as in Example 1 was carried out to produce a resin coated ultra-thin glass sheet (SG-10). Results of evaluation performed by the methods described above are given in Table 2.

Comparative Example 5

Except for replacing VYLON 200 with a (meth)acrylate resin (trade name "Optimus (registered trademark) 7500", manufactured by Mitsubishi Gas Chemical Co., Inc.), the same procedure as for GB-1 was carried out to prepare a thermoplastic resin-containing composition (GB-5).

Except for forming an organic film (B-7) using GB-5 prepared above, the same procedure as in Example 1 was carried out to produce a resin coated ultra-thin glass sheet (SG-11). Results of evaluation performed by the methods described above are given in Table 2.

TABLE 1

| material | thermoplastic resin type (wt %) | thermoplastic resin molecular weight | thermoplastic resin Tg (° C.) | thermosetting resin type (wt %) | siloxane resin (wt %) | silica particles (wt %) | photo-radical polymerization initiator (wt %) | compound having two or more radical polymerizable groups (wt %) | other additives (wt %) | surfactant |
|---|---|---|---|---|---|---|---|---|---|---|
| GR-1 | — | — | — | — | siloxane resin PS-1 (33) | PMA-ST (33) | Omnirad 819 (6) | M-315 (17) | OXT-191 (4) ZC-150 (5) KBM-903 (2) | DS-21 BYK-3550 |
| GR-2 | — | — | — | — | siloxane resin PS-2 (69) | PMA-ST (28) | — | — | KBM-9659 (2) MDT (1) | DS-21 BYK-3550 |
| GB-1 | VYLON 200 (100) | 17,000 | 67 | — | — | — | — | — | — | DS-21 |
| GB-2 | VYLON 600 (100) | 16,000 | 47 | — | — | — | — | — | — | DS-21 |
| GB-3 | SOLBIN TA-5R (100) | 61,000 | 78 | — | — | — | — | — | — | DS-21 |
| GB-4 | Hi-pearl M-4006 (100) | 35,000 | 105 | — | — | — | — | — | — | DS-21 |
| GB-5 | OPTIMUS 7500 (100) | 156,000 | 122 | — | — | — | — | — | — | DS-21 |
| GB-6 | VYLON GK-360 (100) | 16,000 | 56 | — | — | — | — | — | — | DS-21 |
| GB-7 | VYLON 270 (100) | 23.000 | 67 | — | — | — | — | — | — | DS-21 |
| GB-8 | VYLON GK-880 (100) | 18,000 | 84 | — | — | — | — | — | — | DS-21 |
| GB-9 | VYLON 200 (90) | 17.000 | 67 | NK-Oligo U-6LPA (10) | — | — | — | — | — | DS-21 |
| GB-10 | VYLON 200 (80) | 17,000 | 67 | NK-Oligo U-6LPA (20) | — | — | — | — | — | DS-21 |
| GB-11 | VYLON 200 (70) | 17,000 | 67 | NK-Oligo U-6LPA (30) | — | — | — | — | — | DS-21 |
| GB-12 | VYLON 200 (90) | 17,000 | 67 | NK-Oligo UA-122P (10) | — | — | — | — | — | DS-21 |
| GB-13 | VYLON 200 (90) | 17.000 | 67 | NK-Oligo U-2HA (10) | — | — | — | — | — | DS-21 |

TABLE 2-1

| | | Example 1 | Example 2 | Example 3 | Example 4 | Example 5 | Example 6 | Example 7 | Example 8 | Example 9 |
|---|---|---|---|---|---|---|---|---|---|---|
| hard coat layer | | H-1 | — | H-1 | H-1 | H-1 | H-1 | H-1 | H-1 | H-1 |
| organic film (B) | resin composition | GB-1 | GB-1 | GB-1 | GB-1 | GB-2 | GB-3 | GB-4 | GB-6 | GB-7 |
| | film thickness | 20 μm | 20 μm | 20 μm | 40 μm | 20 μm | 20 μm | 20 μm | 20 μm | 20 μm |
| organic film (C) | resin composition | GR-1 | GR-1 | GR-2 | GR-1 | GR-1 | GR-1 | GR-1 | GR-1 | GR-1 |
| | film thickness | 5 μm | 5 μm | 5 μm | 5 μm | 5 μm | 5 μm | 5 μm | 5 μm | 5 μm |
| evaluation results | strength impact | 16 cm | 14 cm | 13 cm | 21 cm | 8 cm | 12 cm | 12 cm | 10 cm | 17 cm |
| | resistance (PT1) | ◉ | ○ | ○ | ◉ | ○ | ○ | ○ | ◉ | ◉ |
| | bending resistance (BT1) | 10,000 times ◉ | 10,000 times ◉ | 6,000 times ○ | 10,000 times ◉ | 10,000 times ◉ | 4,000 times ○ | 7,000 times ○ | 10,000 times ◉ | 10,000 times ◉ |
| | YI of buffer film (B) | 0.1 | 0.1 | 0.1 | 0.4 | 0 | 80.7 | 0 | 0.1 | 0.1 |
| | pencil hardness | 2H | 6 B | 2H | 2H | 2H | 2H | 2H | 2H | 2H |

TABLE 2-2

|  |  | Example 10 | Example 11 | Example 12 | Example 13 | Example 14 | Example 15 | Example 16 |
|---|---|---|---|---|---|---|---|---|
| hard coat layer | | H-1 | H-1 | — | H-1 | H-1 | H-1 | H-1 |
| organic film (B) | resin composition | GB-8 | GB-9 | GB-9 | GB-10 | GB-11 | GB-12 | GB-13 |
| | film thickness | 20 μm | 20 μm | 20 μm | 20 μm | 20 μm | 20 μm | 20 μm |
| organic film (C) | resin composition | GR-1 | GR-1 | GR-1 | GR-1 | GR-1 | GR-1 | GR-1 |
| | film thickness | 5 μm | 5 μm | 5 μm | 5 μm | 5 μm | 5 μm | 5 μm |
| evaluation results | strength impact resistance (PT1) | 12 cm ○ | 18 cm ◎ | 17 cm ◎ | 18 cm ◎ | 18 cm ◎ | 16 cm ◎ | 16 cm ◎ |
| | bending resistance (BT1) | 10,000 times ◎ | 10,000 times ◎ | 10,000 times ◎ | 9,000 times ○ | 8,000 times ○ | 10,000 times ◎ | 10,000 times ◎ |
| | YI of buffer film (B) | 0.5 | 0.5 | 0.5 | 1.3 | 2.7 | 0.5 | 0.5 |
| | pencil hardness | 2H | 5H | H | 6H | 7H | 3H | 4H |

TABLE 2-3

|  |  | Comparative example 1 | Comparative example 2 | Comparative example 3 | Comparative example 4 | Comparative example 5 |
|---|---|---|---|---|---|---|
| hard coat layer | | — | H-1 | H-1 | H-1 | H-1 |
| organic film (B) | resin composition | — | — | GR-1 | GB-1 | GB-5 |
| | film thickness | — | — | 5 μm | 20 μm | 20 μm |
| organic film (C) | resin composition | — | GR-1 | GR-1 | — | GR-1 |
| | film thickness | — | 5 μm | 5 μm | — | 5 μm |
| evaluation results | strength impact resistance (PT1) | 1 cm X | 3 cm X | 4 cm X | 11 cm ○ | 10 cm ○ |
| | bending resistance (BT1) | once X | 10,000 times ◎ | 10,000 times ◎ | once X | once X |
| | YI of buffer film (B) | — | — | 0.4 | 0.1 | 0 |
| | pencil hardness | 7H | 7H | 4H | 2H | 2H |

INDUSTRIAL APPLICABILITY

The resin coated ultra-thin glass sheet according to the present invention is high in impact resistance and also high in bending resistance and has high transparency, and therefore, it can be used as cover glass for flexible displaying devices.

The invention claimed is:

1. A resin coated ultra-thin glass sheet of a three layer structure comprising:
    an ultra-thin glass sheet (A) with a thickness of 10 μm or more and 100 μm or less having first and second opposing surfaces,
    an organic film (B) disposed on either the first or second surface, and
    an organic film (C) disposed on the surface opposing the surface on which the organic film (B) is formed,
    wherein
    the organic film (B) is formed from a composition
        containing a thermoplastic resin (D) that is either a polyester resin or a (meth)acrylate resin, that has a weight-average molecular weight of 1,000 to 70,000 and that has a glass transition temperature of 40° C. to 110° C., and
        containing a urethane (meth)acrylate compound that accounts for 5 to 35 wt % relative to total solid content in the organic film (B), and
    the organic film (C) is formed from a composition containing a siloxane resin (E) with a weight-average molecular weight of 2,000 to 7,000.

2. A resin coated ultra-thin glass sheet as set forth in claim 1, wherein the organic film (B) is a buffer film (b); the organic film (C) is a reinforcing film (c); and the ultra-thin glass sheet (A) has a thickness of 20 μm or more and 100 μm or less.

3. A resin coated ultra-thin glass sheet as set forth in claim 1, wherein the organic film (B) has a thickness of 10 μm or more and 100 μm or less.

4. A resin coated ultra-thin glass sheet as set forth in claim 1, wherein the organic film (C) has a thickness of 1 μm or more and 20 μm or less.

5. A resin coated ultra-thin glass sheet as set forth in claim 1, wherein the siloxane resin (E) contains phenyl groups that are present in an amount of 5 to 60 mol % relative to silicon atom content in the siloxane resin (E).

6. A resin coated ultra-thin glass sheet as set forth in claim 1, wherein the urethane (meth)acrylate compound has a double bond equivalent weight of 100 to 600 g/mol.

7. A resin coated ultra-thin glass sheet as set forth in claim 1, wherein the yellow index (YI) of the organic film (B) satisfies the relation |YI|<20.

8. A resin coated ultra-thin glass sheet as set forth in claim 1, wherein the ultra-thin glass (A) is a chemically reinforced glass.

9. A resin coated ultra-thin glass sheet as set forth in claim 1, wherein a hard coat layer is present on that surface of the organic film (B) which is not covered by the ultra-thin glass (A).

* * * * *